United States Patent
Kim et al.

(10) Patent No.: US 12,214,662 B2
(45) Date of Patent: Feb. 4, 2025

(54) ELECTRONIC DEVICE MOUNTED ON VEHICLE AND OPERATING METHOD OF THE ELECTRONIC DEVICE TO RECEIVE INFORMATION ABOUT PROXIMATE OBJECTS

(71) Applicant: Samsung Electronics Co., Ltd., Gyeonggi-do (KR)

(72) Inventors: Youngil Kim, Gyeonggi-do (KR);
Taejun Kim, Gyeonggi-do (KR);
Bosung Seo, Gyeonggi-do (KR);
Sanghoon Lee, Gyeonggi-do (KR);
Youngseok Lee, Gyeonggi-do (KR);
Woong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/953,431

(22) Filed: Sep. 27, 2022

(65) Prior Publication Data

US 2023/0120933 A1 Apr. 20, 2023

Related U.S. Application Data

(63) Continuation of application No. PCT/KR2022/012285, filed on Aug. 17, 2022.

(30) Foreign Application Priority Data

Oct. 20, 2021 (KR) .......................... 10-2021-0140487

(51) Int. Cl.
*B60K 35/00* (2024.01)
*B60K 35/10* (2024.01)
(Continued)

(52) U.S. Cl.
CPC ............ *B60K 35/00* (2013.01); *G06T 19/006* (2013.01); *B60K 35/10* (2024.01); *B60K 35/213* (2024.01);
(Continued)

(58) Field of Classification Search
None
See application file for complete search history.

(56) References Cited

U.S. PATENT DOCUMENTS 9,713,956 B2 * 7/2017 Bark ..................... B60K 35/00
9,969,267 B2 5/2018 McNew
(Continued)

FOREIGN PATENT DOCUMENTS

JP 2009-26003 A 2/2009
KR 10-2013-0123265 A 11/2013
(Continued)

OTHER PUBLICATIONS

Korean Search Report dated Nov. 23, 2022.

*Primary Examiner* — Jason A Pringle-Parker
(74) *Attorney, Agent, or Firm* — Cha & Reiter, LLC

(57) ABSTRACT

Provided are an electronic device mounted on a vehicle and an operating method of the electronic device. An electronic device, according to an embodiment of the disclosure, obtains a surrounding environment image by using a camera, detects at least one object from the surrounding environment image by using an artificial intelligence (AI) model, receives a vehicle to everything (V2X) data set including information about the at least one object, selects a first object in the detected at least one object by a user input, obtains information about a type of the first object by using a detection result determined based on the surrounding environment image and the received V2X data set, and displays a user interface (UI) for wireless communication connection (Continued)

with the first object, based on the information about the type of the first object.

15 Claims, 18 Drawing Sheets

(51) Int. Cl.
  *B60K 35/21* (2024.01)
  *B60K 35/28* (2024.01)
  *B60K 35/29* (2024.01)
  *B60K 35/85* (2024.01)
  *G06T 19/00* (2011.01)
(52) U.S. Cl.
  CPC .............. *B60K 35/28* (2024.01); *B60K 35/29* (2024.01); *B60K 35/85* (2024.01); *B60K 2360/11* (2024.01); *B60K 2360/164* (2024.01); *B60K 2360/166* (2024.01); *B60K 2360/177* (2024.01); *B60K 2360/178* (2024.01); *B60K 2360/179* (2024.01); *B60K 2360/191* (2024.01); *B60K 2360/589* (2024.01)

(56) References Cited

U.S. PATENT DOCUMENTS

| | | | |
|---|---|---|---|
| 10,613,729 B2 * | 4/2020 | Cohrt | .................... G06T 19/006 |
| 10,836,399 B2 | 11/2020 | Kim et al. | |
| 11,119,634 B2 | 9/2021 | Kim | |
| 11,132,840 B2 * | 9/2021 | Sarangdhar | ............ H04L 67/125 |
| 2010/0253539 A1 * | 10/2010 | Seder | .................... G01C 21/365 |
| | | | 340/902 |
| 2014/0063064 A1 * | 3/2014 | Seo | .................. G08G 1/096741 |
| | | | 345/633 |
| 2015/0178990 A1 * | 6/2015 | Ng-Thow-Hing | ..... B60K 35/00 |
| | | | 715/850 |
| 2016/0284217 A1 * | 9/2016 | Lee | .................... B62D 15/0285 |
| 2016/0313902 A1 * | 10/2016 | Hill | ........................ G06F 3/0482 |
| 2018/0059416 A1 * | 3/2018 | Bhalla | .................... B60K 35/00 |
| 2018/0066956 A1 * | 3/2018 | Kim | .................... G01C 21/3682 |
| 2018/0149491 A1 | 5/2018 | Tayama | |
| 2018/0204061 A1 * | 7/2018 | Antol | ...................... G06V 20/20 |
| 2018/0225963 A1 * | 8/2018 | Kobayashi | ................ G08G 1/09 |
| 2019/0035153 A1 * | 1/2019 | Dange | .................... G06V 20/20 |
| 2019/0144001 A1 | 5/2019 | Choi et al. | |
| 2020/0151943 A1 * | 5/2020 | Navarrette | ............. G02B 27/01 |
| 2020/0361482 A1 | 11/2020 | Choi et al. | |
| 2020/0406752 A1 * | 12/2020 | Ahn | ...................... G06F 3/0304 |

FOREIGN PATENT DOCUMENTS

| | | |
|---|---|---|
| KR | 10-1410273 B1 | 6/2014 |
| KR | 10-1708657 B1 | 2/2017 |
| KR | 10-2007228 B1 | 8/2019 |
| KR | 10-2020-0067645 A | 6/2020 |
| KR | 10-2020-0075913 A | 6/2020 |
| KR | 10-2201290 B1 | 1/2021 |
| WO | 2020/229841 A1 | 11/2020 |

* cited by examiner

FIG. 9
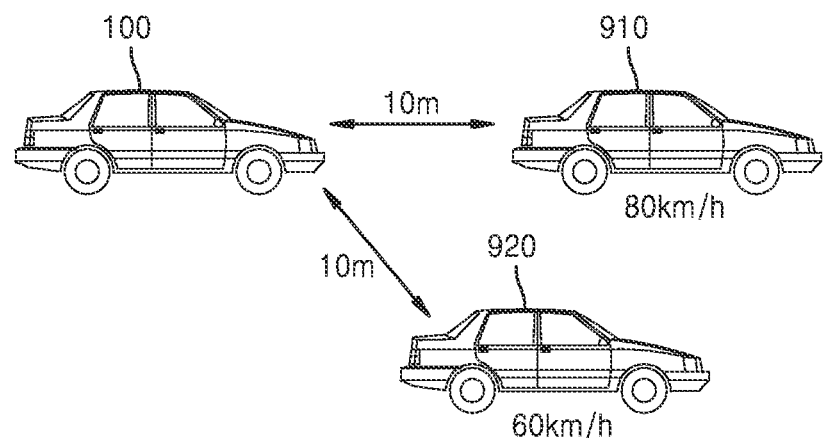
<POSITION RELATIONSHIP BETWEEN
VEHICLES AT FIRST TIMEPOINT>
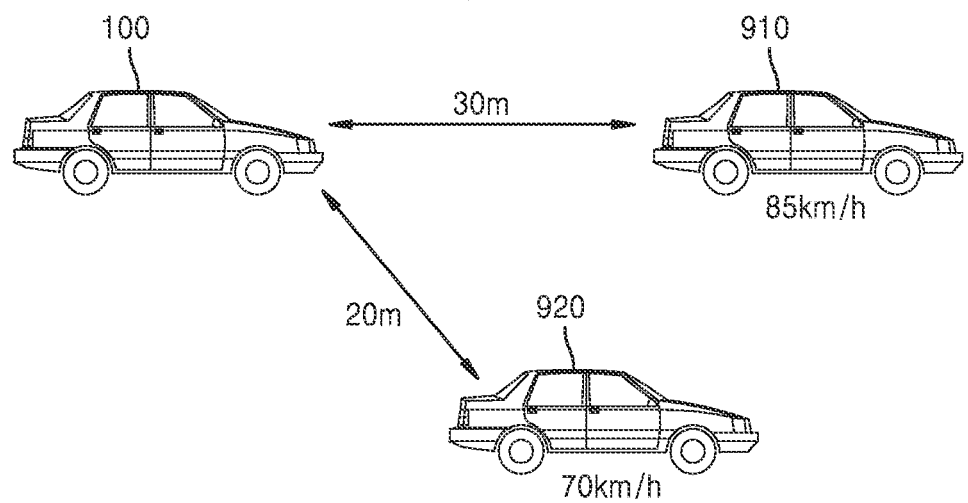
<POSITION RELATIONSHIP BETWEEN
VEHICLES AT SECOND TIMEPOINT>

<RAPID DECELERATION>

<CRUISE>

<RAPID ACCELERATION>

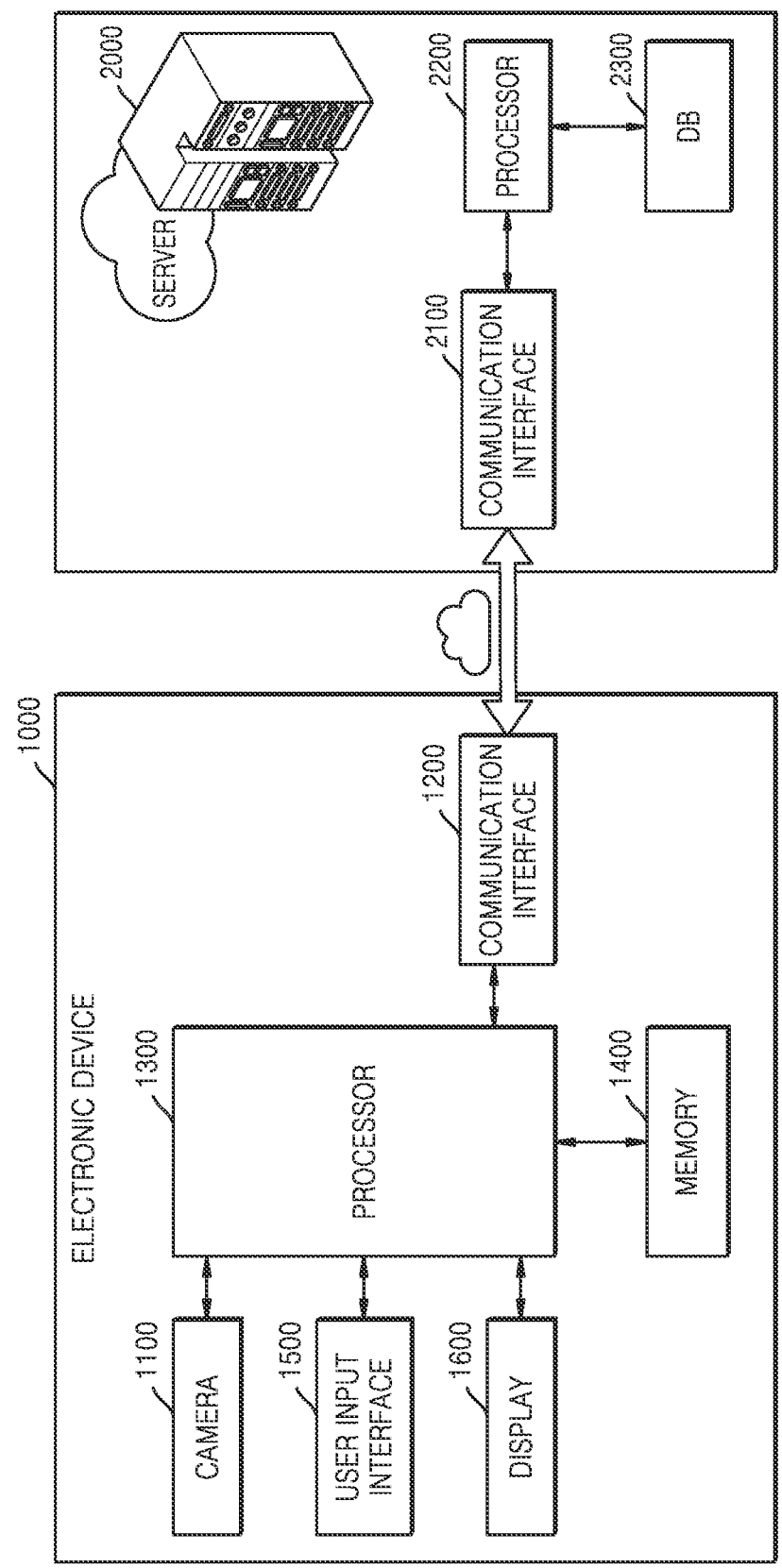

ELECTRONIC DEVICE MOUNTED ON VEHICLE AND OPERATING METHOD OF THE ELECTRONIC DEVICE TO RECEIVE INFORMATION ABOUT PROXIMATE OBJECTS

CROSS-REFERENCE TO RELATED APPLICATION(S)

This application is a continuation application which is based on and claims priority under 35 U.S.C. § 120 to PCT International Application No. PCT/KR2022/012285, which was filed on Aug. 17, 2022, and claims priority to Korean Patent Application No. 10-2021-0140487, filed on Oct. 20, 2021, in the Korean Intellectual Property Office, the disclosure of which are incorporated by reference herein their entirety.

BACKGROUND

Technical Field

One or more embodiments of the disclosure generally relate to an electronic device mounted on a vehicle and an operating method of the electronic device. More specifically, one or more embodiments relate to a method and an electronic device for performing bidirectional wireless communication connection with objects such as other vehicles, pedestrians, traffic lights, signboards, etc., in the vicinity of a vehicle.

Description of Related Art

In recent years, vehicle to everything (V2X) communication for transmitting and receiving data from vehicles via wired/wireless communication has been used. V2X communication may refer to techniques used by a vehicle to transmit and receive data to and from objects within the environment or infrastructure, such as other vehicles, roads, etc., through wired/wireless communication. Communication with individual objects may be referred to as vehicle to vehicle (V2V) communication, vehicle to infrastructure (V2I) communication, vehicle to pedestrian (V2P) communication, and vehicle to network (V2N) communication, etc.

The existing V2X communication technique is mainly limitedly to unidirectional communication for receiving information or data from other vehicles or objects. For example, an electronic device mounted on a vehicle may merely receive information through V2X communication, such as receiving speed information of other vehicles, obtaining information about stores through signboards in the street, and so forth.

There is a need for bidirectional V2X communication through which an electronic device mounted on a vehicle performs V2X communication with objects such as other vehicles, pedestrians, traffic lights, signboards, etc., so that the electronic device can perform a function or an operation for the objects as well as receiving information. To allow users to conveniently use the bidirectional V2X communication service, the electronic device may need to provide a user interface (UI) for communication connection with other objects in a vicinity of the vehicle and performing functions or operations related to the objects.

SUMMARY

One or more embodiments of the instant disclosure provide an electronic device that performs bidirectional wireless communication connection with an object in the vicinity of a vehicle, and an operating method of the electronic device. Certain embodiments of the disclosure provide an electronic apparatus that detects an object in the vicinity of the vehicle and provides a user interface (UI) for wireless communication connection with an object selected by a user input, and an operating method of the electronic apparatus.

According to an embodiment of the disclosure, there is provided an electronic device mounted on a vehicle. An electronic device mounted on a vehicle according to an embodiment of the disclosure includes a communication interface, a user input interface, a display, a camera mounted on the vehicle and configured to obtain a surrounding environment image by photographing a surrounding environment of the vehicle, a memory storing at least one instruction, and at least one processor configured to execute at least one instruction stored in the memory, in which the at least one processor is further configured to, by executing the at least one instruction, detect at least one object from the surrounding environment image by using an object detection model, receive a vehicle to everything (V2X) data set including information about the at least one object, select a first object in the detected at least one object based on a user input received through the user input interface, obtain information about a type of the first object by using a detection result determined based on the surrounding environment image and the received V2X data set, and display a user interface (UI) for wireless communication connection with the first object on the display, based on the information about the type of the first object, in which the UI includes a menu UI selectable to perform a function or an operation determined based on the type of the first object.

In an embodiment of the disclosure, the processor may be further configured to, by executing the at least one instruction, control the display to display the UI in different colors and different forms before, during, and after making the wireless communication connection with the selected first object.

In an embodiment of the disclosure, the processor may be further configured to, by executing the at least one instruction, control the display to display images corresponding to the at least one object included in the surrounding environment image in different colors, according to types of the at least one object.

In an embodiment of the disclosure, the processor may be further configured to, by executing the at least one instruction, control the display to display an object information UI that includes profile information, wireless communication connection signal strength, battery level, and/or moving speed of the first object, the object information UI including characters, numbers, symbols, and/or icons.

In an embodiment of the disclosure, the processor may be further configured to, by executing the at least one instruction, control the display to display a focusing UI including an icon or a symbol encompassing an image corresponding to the first object on the surrounding environment image.

In an embodiment of the disclosure, the processor may be further configured to, by executing the at least one instruction, control the display to display the focusing UI encompassing the first object in different colors according to the moving speed of the first object.

In an embodiment of the disclosure, the processor may be further configured to, by executing the at least one instruction, receive a content image including an advertisement image or an introduction image from the first object through the communication interface and control the display to display the received content image, in which the UI is displayed after the content image is displayed.

In an embodiment of the disclosure, the display may be any one of an augmented reality (AR) head up display (HUD) of the vehicle, a transparent display formed on a windshield of the vehicle, a center information display (CID) of the vehicle, a navigation device of the vehicle, or an instrument panel display.

In an embodiment of the disclosure, the processor may be further configured to, by executing the at least one instruction, obtain, from the surrounding environment image, license plate information, position information, type information, and/or predicted speed information of the first object, match the obtained information with information included in the received V2X data set and extract identification information and type information of the first object from the V2X data set, based on a result of the matching.

In an embodiment of the disclosure, the processor is further configured to, by executing the at least one instruction control the communication interface to perform wireless communication connection with the first object, by using the extracted identification information.

According to another embodiment of the disclosure, there is provided an operating method of an electronic device mounted on a vehicle. The operating method of the electronic device according to an embodiment of the disclosure includes obtaining a surrounding environment image by photographing a surrounding environment of the vehicle by using a camera mounted on a front of the vehicle, detecting at least one object from the surrounding environment image by using an artificial intelligence (AI) model, receiving a vehicle to everything (V2X) data set including information about the at least one object, selecting a first object in the detected at least one object, based on a user input, obtaining information about a type of the first object by using a detection result determined based on the surrounding environment image and the received V2X data set, and displaying a user interface (UI) for wireless communication connection with the first object on the display, based on the information about the type of the first object, in which the UI includes a menu UI selectable to perform a function or an operation determined based on the type of the first object.

In an embodiment of the disclosure, the displaying of the UI may include displaying the UI in different colors and different forms before, during, and after making the wireless communication connection with the selected first object.

In an embodiment of the disclosure, the displaying of the UI may include displaying images corresponding to the at least one object included in the surrounding environment image in different colors, according to types of the at least one object.

In an embodiment of the disclosure, the displaying of the UI may include displaying an object information UI that includes profile information, wireless communication connection signal strength, battery level, and/or moving speed of the first object, the object information UI including characters, numbers, symbols, and/or icons.

In an embodiment of the disclosure, the displaying of the UI may include displaying a focusing UI including an icon or a symbol encompassing an image corresponding to the first object on the surrounding environment image.

In an embodiment of the disclosure, the displaying of the focusing UI may include displaying the focusing UI encompassing the first object in different colors according to the moving speed of the first object.

In an embodiment of the disclosure, the operating method may further include displaying an advertisement content or an introduction image received from the first object, in which the displaying of the UI is performed after the advertisement content or the introduction image is displayed.

In an embodiment of the disclosure, a display of the electronic device may be any one of an augmented reality (AR) head up display (HUD) of the vehicle, a transparent display formed on a windshield of the vehicle, a center information display (CID) of the vehicle, a navigation device of the vehicle, or an instrument panel display.

In an embodiment of the disclosure, the obtaining of the information about the type of the first object may include obtaining, from the surrounding environment image, license plate information, position information, type information, and/or predicted speed information of the first object, matching the obtained information with information included in the received V2X data set, and extracting identification information and type information of the first object from the V2X data set, based on a result of the matching.

According to another embodiment of the disclosure, there is provided a computer-readable recording medium having recorded thereon a program for executing, on a computer, an operating method of an electronic device mounted on a vehicle.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a view for describing an operation, performed by an electronic device according to an embodiment of the disclosure, of obtaining identification information of an object based on a position relationship change of the object over time;

FIG. 17 is a view for describing in detail the example of FIG. 16.

DETAILED DESCRIPTION

Figure 1:
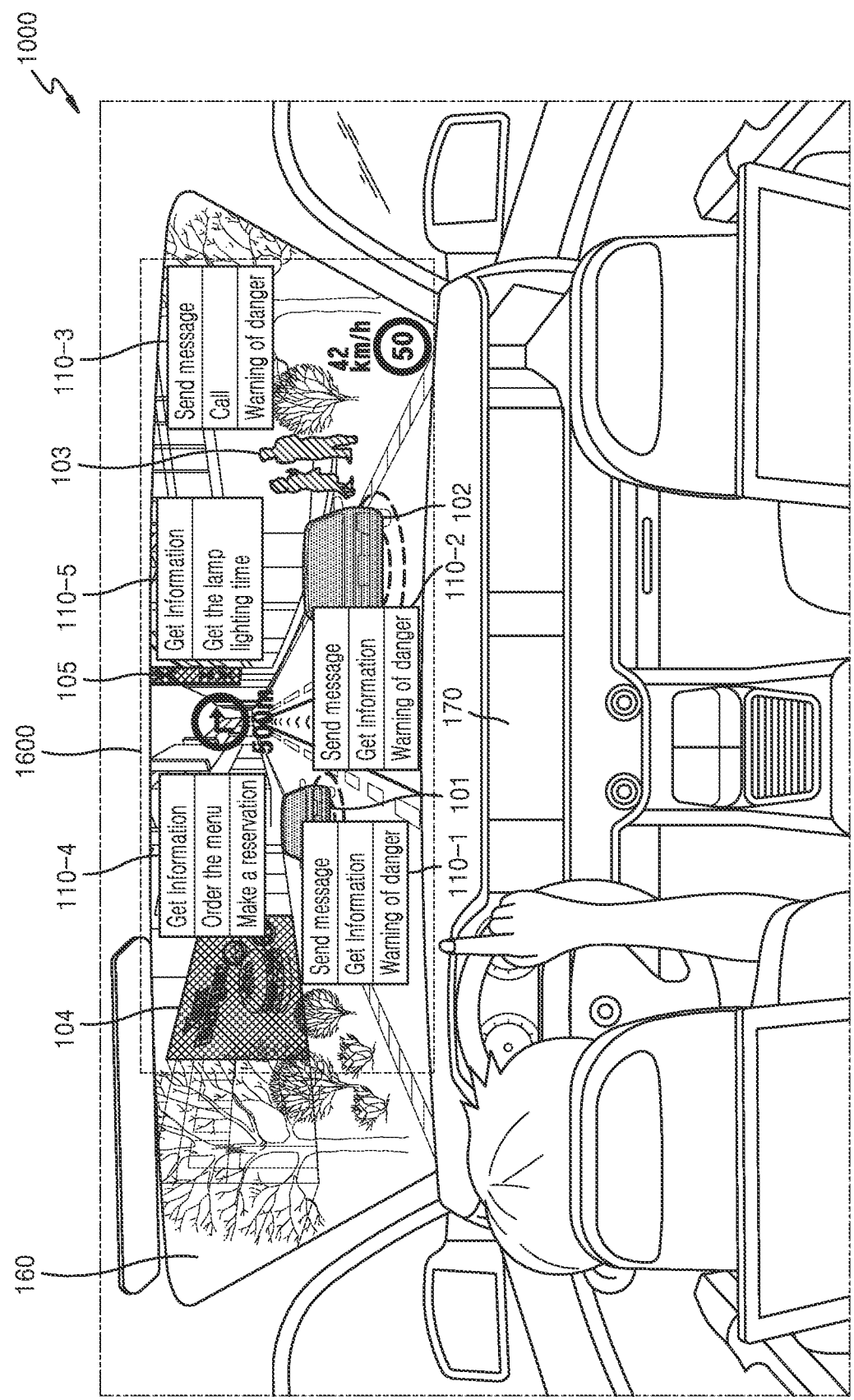
FIG. 1 is a conceptual diagram showing an example where an electronic device according to the disclosure displays a user interface (UI) for performing wireless communication connection with an object around a vehicle.

Throughout the disclosure, the expression "at least one of a, b or c" indicates only a, only b, only c, both a and b, both a and c, both b and c, all of a, b, and c, or variations thereof.

Although terms used in embodiments of the disclosure are used in their conventional sense at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of an embodiment of the disclosure. Thus, the terms used in herein should be defined not by the simple names of the terms but by the meaning of the terms and the contents throughout the disclosure.

It is to be understood that the singular forms include plural references unless the context clearly dictates otherwise. All terms including technical or scientific terms used herein have the same meaning as commonly understood by those of ordinary skill in the art described herein.

Throughout the entirety of the specification of the disclosure, when it is assumed that a certain part includes a certain component, it may mean that a corresponding component may further include other components unless specially described to the contrary. The term used herein such as "unit" or "module" indicates a unit for processing at least one function or operation, and may be implemented in hardware, software, or in a combination of hardware and software.

Expression used in the disclosure " . . . configured to" may be interchangeably used with, for example, " . . . suitable for", " . . . having the capacity to", " . . . designed to", " . . . adapted to", " . . . made to", or " . . . capable of", depending on a situation. The term " . . . configured to" may not necessarily mean " . . . specially designed to" in terms of hardware. Instead, in a certain situation, the expression "a system configured to . . . " may mean that the system is "capable of . . . " together with other devices or parts. For example, the phrase "a processor configured (or set) to perform A, B, and C" may mean a dedicated processor (e.g., an embedded processor) for performing a corresponding operation or a general-purpose processor (e.g., a central processing unit (CPU) or an application processor) capable of performing corresponding operations by executing one or more software programs stored in a memory.

Moreover, in the disclosure, when a component is mentioned as being "connected" or "coupled" to another component, it may be directly connected or directly coupled to the other component, but unless described otherwise, it should be understood that the component may also be connected or coupled to the other component via still another component therebetween.

Hereinafter, embodiments of the present disclosure will be described in detail with reference to the attached drawings to allow those of ordinary skill in the art to easily carry out the embodiments of the present disclosure. However, the disclosure may be implemented in various different forms, and are not limited to the embodiments of the disclosure described herein.

Hereinafter, the embodiments of the disclosure will be described in detail with reference to the drawings.

FIG. 1 is a conceptual view showing an example where an electronic device 1000 displays user interfaces (UIs) 110-1 to 110-5 for performing wireless communication connection with an object around a vehicle according to an embodiment of the disclosure.

Referring to FIG. 1, the electronic device 1000 may be mounted on the vehicle and include a display 1600. In the embodiment shown in FIG. 1, the display 1600 may be an augmented reality (AR) head-up display (HUD) that projects a virtual image on a windshield 160 of the vehicle by using a projector. However, the disclosure is not limited thereto, and the display 1600 may include, for example, at least one of a transparent display formed on the windshield 160 of the vehicle, a center information display (CID) 170, a navigation device, an instrument panel display, or a front passenger seat display.

The electronic device 1000 may photograph at least one object 101 to 105 located or moving around the vehicle by using a camera to obtain a surrounding environment image including the at least one object 101 to 105. The at least one object 101 to 105 may be, for example, at least one of another vehicle, a pedestrian, a traffic light, a billboard, or a signboard, but is not limited thereto. In the embodiment shown in FIG. 1, a first object 101 and a second object 102 may be another vehicle moving around the vehicle, a third object 103 may be a pedestrian located around the vehicle, a fourth object 104 may be a signboard of a restaurant, and a fifth object 105 may be a signboard of a theater.

The electronic device 1000 may detect the at least one object 101 to 105 from the surrounding environment image by using an AI model. The AI model may be configured as an object detection model based on deep learning. In an embodiment of the disclosure, the object detection model may include a deep neural network model including model parameters trained by applying several tens of thousands to hundreds of millions of images as input data and applying a label of an object included in an image as an output ground truth. In an embodiment of the disclosure, the electronic device 1000 may detect the type of the at least one object 101 to 105 through inference using the object detection model. For example, the electronic device 1000 may be detect types of the first object 101 and the second object 102 as vehicle and the type of the third object 103 as person. Likewise, the electronic device 1000 may detect types of the fourth object 104 and the fifth object 105 as signboard.

In an embodiment of the disclosure, the electronic device 1000 may display the at least one object 101 to 105 in different colors, according to the types of the at least one object 101 to 105. In the embodiment shown in FIG. 1, the electronic device 1000 may display the first object 101 and the second object 102, which are vehicles, in red, the third object 103, which is a pedestrian, in yellow, and the fourth object 104 and the fifth object 105, which are signboards, in green, without being limited thereto.

The electronic device 1000 may receive a vehicle to everything (V2X) data set from the at least one object 101 to 105 or a road side unit (RSU). The V2X data set may include information related to the at least one object 101 to 105. For example, the V2X data set may include at least one of identification information (ID information), reception date, license plate information, type information, position information, direction information, or speed information of each of the at least one object 101 to 105.

The electronic device 1000 may receive an input to select any one of the at least one object 101 to 105 from the user. In an embodiment of the disclosure, the electronic device 1000 may receive a user input to select any one object via AR pointing input such as hand tracking, eye tracking, or via an input controller, etc. In the embodiment shown in FIG. 1, the electronic device 1000 may receive a user input to select the first object 101 by using a hand tracking device for tracking a position of a finger of the user. However, the electronic device 1000 may not receive only AR pointing input. In another embodiment of the disclosure, the electronic device 1000 may receive a user input to select the first object 101 from the at least one object 101 to 105 through a touch input, a gesture input, a voice input, etc.

The electronic device 1000 may select the first object 101 from the at least one object 101 to 105 based on the user input. The electronic device 1000 may obtain identification information about the first object 101 by using a detection result with respect to the surrounding environment image and the V2X data set. In an embodiment of the disclosure, the electronic device 1000 may obtain information such as license plate information, position information, type information, or expected speed information of the first object 101, detected from the surrounding environment image, and match the object information with information included in the V2X data set, thus obtaining the identification information regarding the first object 101.

The electronic device 1000 may display the at least one UI 110-1 to 110-5 for performing wireless communication connections with the at least one object 101 to 105. In an embodiment of the disclosure, the electronic device 1000 may display the at least one UI 110-1 to 110-5 by projecting a virtual image on the display 1600 configured with an AR HUD using a projector. However, the disclosure is not limited thereto, and in another embodiment of the disclosure, the electronic device 1000 may display the UIs 110-1 to 110-5 on at least one of the CID 170, the navigation device, the instrument panel display, or the front passenger seat display.

The at least one UI 110-1 to 110-5 may correspond to the at least one object 101 to 105, respectively, and may be displayed adjacent to the at least one object 101 to 105. The at least one UI 110-1 to 110-5 may be a contextual menu UI that provides a customized menu according to the type of the at least one object 101 to 105. In an embodiment of the disclosure, the at least one UI 110-1 to 110-5 may include a menu UI selectable to perform a function or an operation determined based on the type of the at least one object 101 to 105.

The menu UI may include a plurality of items for receiving a user input to select a function or an operation that may be performed for each of the at least one object 101 to 105. In the embodiment shown in FIG. 1, a first UI 110-1 may include a plurality of items for receiving a user input to perform operations determined based on that the type of the first object 101 is a vehicle, and the operations may include sending a message to the vehicle, obtaining vehicle information, or transmitting a danger warning signal. The third UI 110-3 may include a plurality of items for receiving a user input to perform operations that may be performed for a pedestrian because the type of the third object 103 is a pedestrian, and the operations may include sending a message, calling a phone of that person, or transmitting a danger warning signal. The fourth UI 110-4 may include a plurality of items for receiving a user input to perform operations determined based on that the type of the fourth object 104 is a signboard of a restaurant, and the operations may include obtaining restaurant information, ordering food from a food menu, or making a reservation. Likewise, the fifth UI 110-5 may include a plurality of items for receiving a user input to perform operations determined based on that the type of the fifth object 105 is a signboard, and the operations may include obtaining information or obtaining a lamp lighting time of the signboard.

The electronic device 1000 may perform a wireless communication connection with the first object 101 based on identification information of the first object 101 selected by the user input. In an embodiment of the disclosure, the electronic device 1000 may perform a bidirectional V2X communication connection with the first object 101. The electronic device 1000 may perform a function or an operation corresponding to an item selected by the user input in the plurality of items included in the first UI 110-1 corresponding to the first object 101. For example, when an item for sending a message is selected by the user input through the first UI 110-1, the electronic device 1000 may perform the operation of sending the message to the first object 101.

Existing V2X communication is limited to unidirectional communication for receiving information or data from other vehicles or objects. For example, an electronic device mounted on a vehicle may merely receive information through V2X communication, such as receiving speed information of other vehicles, obtaining information of stores through signboards in the street, and so forth. There is a need for a bidirectional V2X communication service through which an electronic device mounted on a vehicle performs V2X communication with objects such as other vehicles, pedestrians, traffic lights, signboards, etc., so that the electronic device can perform a function or an operation for the objects as well as receiving information.

The electronic device 1000 according to an embodiment of the disclosure, without being limited to merely performing the operation of obtaining information from another vehicle or a signboard, may perform bidirectional V2X communication with the at least one object 101 to 105 such as another vehicle, pedestrian, traffic light, signboard, etc., and display the at least one UI 110-1 to 110-5, which are contextual menu UIs for performing functions or operations determined based on the type of each of the at least one object 101 to 105, thereby improving user convenience. The electronic device 1000 according to an embodiment of the disclosure may display a user-friendly graphics UI to increase the frequency of the use of bidirectional V2X communications and enhance usability of the bidirectional V2X communication.

Figure 2:
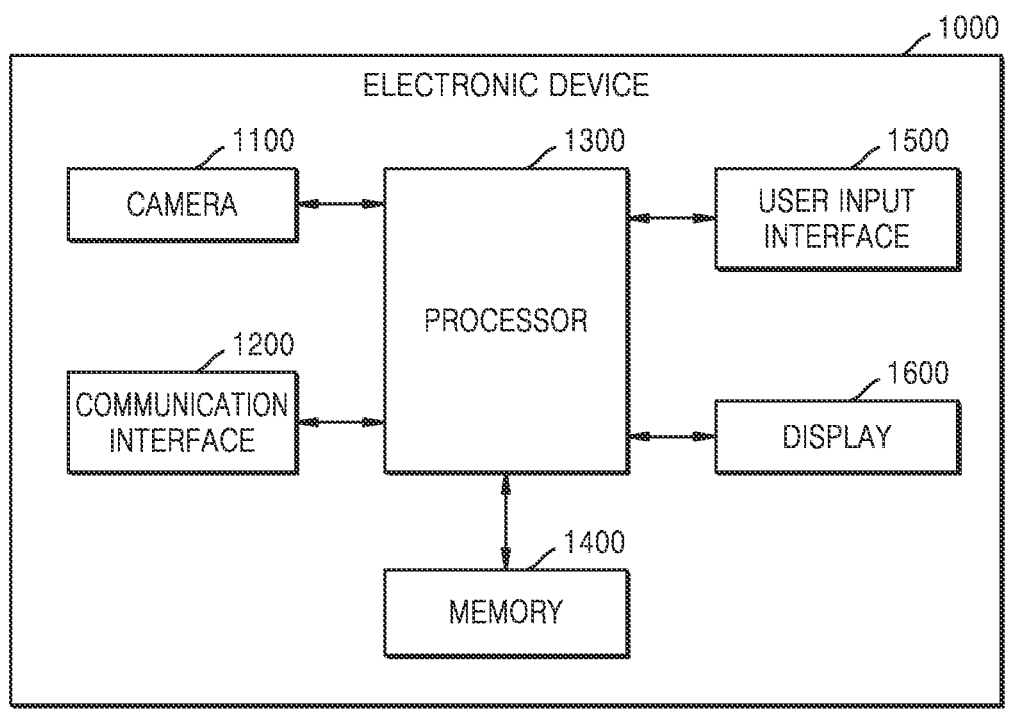
FIG. 2 is a block diagram of elements of an electronic device according to an embodiment of the disclosure.

FIG. 2 is a block diagram of elements of the electronic device 1000 according to an embodiment of the disclosure.

The electronic device 1000 may be mounted inside the vehicle or mounted on an external surface of the vehicle. In an embodiment of the disclosure, the electronic device 1000 may include one or more electronic circuits constituting an electronic control unit (ECU) inside the vehicle. However, the disclosure is not limited thereto.

Referring to FIG. 2, the electronic device 1000 may include a camera 1100, a communication interface 1200, a processor 1300, a memory 1400, a user input interface 1500, and the display 1600. The camera 1100, the communication interface 1200, the processor 1300, the memory 1400, the user input interface 1500, and the display 1600 may be electrically and/or physically connected to one another.

Elements shown in FIG. 2 are merely an example, and elements included in the electronic device 1000 are not limited to those shown in FIG. 2. The electronic device 1000 may not include some of the elements shown in FIG. 2 and may further include elements that are not shown in FIG. 2. For example, the electronic device 1000 may further include a global positioning system (GPS) sensor for obtaining information about a current position of the vehicle or a light detection and ranging (LiDAR) sensor for measuring a distance to an object around of the vehicle.

The camera 1100 may be arranged on the exterior of the vehicle. In an embodiment of the disclosure, the camera 1100 may be arranged on the front, left, right, and rear of the vehicle, and may be provided in plural.

The camera 1100 may obtain surrounding environment images by photographing the surrounding environment of the vehicle. The camera 1100 may photograph objects such as another vehicle, pedestrian, traffic light, traffic sign, signboard, or billboard around the vehicle, and obtain a surrounding environment image including the object.

The camera 1100 may include an image sensor and an image processing module. The camera 1100 may obtain still images or moving images obtained by the image sensor (e.g., complementary metal-oxide semiconductor (CMOS) or charge-coupled device (CCD)). The image processing module may process the still images or the moving images obtained through the image sensor to extract required information and deliver the extracted information to the processor 1300.

The communication interface 1200 may be connected with an object outside the vehicle through a wireless communication network, and may be configured to perform data transmission and reception to and from the object. The communication interface 1200 may perform data transmission and reception by using, for example, Code Division Multiple Access (CDMA), Wideband CDMA (WCDMA), 3rd-Generation (3G), 4th-Generation (4G), and/or 5th-Generation (5G), and millimeter waves (mmWAVE) as well as short-range wireless data communication such as a wireless local area network (WLAN) (Wireless Fidelity (WiFi)), Wireless broadband (Wibro), World Interoperability for Microwave Access (Wimax), WiFi-Direct, radio frequency identification (RFID), Infrared Data Association (IrDA), ultra wideband (UWB), ZigBee, near field communication (NFC), or Bluetooth™.

The communication interface 1200 may wirelessly transmit and receive data through a V2X communication connection with an object, a road side unit (RSU), or a server outside the vehicle. In an embodiment of the disclosure, the communication interface 1200 may receive, from the object or the RSU around the vehicle, a V2X data set including information about the object. In this case, the communication interface 1200 may include an on-board unit (OBU) for V2X communication connections.

In an embodiment of the disclosure, the communication interface 1200 may receive weather information and traffic condition information of a road (e.g., transport protocol expert group (TPEG) information) from the object or server outside the vehicle.

The processor 1300 may execute one or more instructions stored in the memory 1400. The processor 1300 may include hardware elements for performing arithmetic, logic, and input/output operations and signal processing. The processor 1300 may include at least one of a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), but is not limited thereto. Further, the processor 1300 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means plus function, unless the element is expressly recited using the phrase "means for." In addition, an artisan understands and appreciates that a "processor" or "microprocessor" may be hardware in the claimed disclosure.

Although the processor 1300 is shown as one element in FIG. 2, the disclosure is not limited thereto. In an embodiment of the disclosure, the processor 1300 may be implemented by a single processor or multiple processors.

The memory 1400 may store instructions for executing a function or an operation of the electronic device 1000. In an embodiment of the disclosure, the memory 1400 may store instructions and program codes, which are readable by the processor 1300. In the following embodiment of the disclosure, the processor 1300 may be implemented by executing the instructions or program codes stored in the memory 1400.

The memory 1400 may include a storage medium of at least one type of a flash memory type, a hard disk type, a multimedia card micro type, a card type memory (e.g., a secure digital (SD) or extreme digital (XD) memory, etc.), random access memory (RAM), static random-access memory (SRAM), read-only memory (ROM), electrically erasable programmable read-only memory (EEPROM), programmable read-only memory (PROM), or an optical disk.

The processor 1300 may implement the following embodiments of the disclosure by executing the instructions or program codes stored in the memory 1400.

The processor 1300 may obtain a surrounding environment image captured by the camera 1100 and detect at least one object from the surrounding environment image. In an embodiment of the disclosure, the processor 1300 may detect the at least one object from the surrounding environment image by using an AI model. The AI model may include a deep neural network model trained to detect an object from image data input from the camera 1100 and to classify the object by type. The AI model may be stored in the memory 1400, but the disclosure is not limited thereto. In an embodiment of the disclosure, the AI model may be stored in a server outside the vehicle, and the electronic device 1000 may transmit image data to the server and receive information about the type of the object, which is a result of inference, from the AI model of the server.

The AI model may include a deep neural network model including model parameters trained by applying several tens of thousands to hundreds of millions of images as input data and applying a label of an object included in an image as an output ground truth. The deep neural network model may include, for example, at least one of a convolutional neural network (CNN), a recurrent neural network (RNN), a restricted Boltzmann machine (RBM), a deep belief network (DBN), a bidirectional recurrent deep neural network (BRDNN), or deep Q-networks. However, the AI model may not include only the deep neural network model, but may also include at least one of a support vector machine (SVM), linear regression, logistic regression, Naive Bayes, a random forest, a decision tree, or a k-nearest neighbor algorithm.

The processor 1300 may include an AI processor. The AI processor may be configured in a dedicated hardware chip form for AI, and may be included as a part of the general-purpose processor (e.g., the CPU or the application processor) or the graphics dedicated processor (e.g., the GPU) in the processor 1300. The AI processor may detect at least one object from the surrounding environment image obtained from the camera 1100, by using the AI model.

The AI model may output an object detection result. In an embodiment of the disclosure, the object detection result may include at least one label regarding the type of the object inferred from the input surrounding environment image and a reliability value regarding the at least one label. Herein, the 'reliability value' may indicate a probability value corresponding to the determined specific type of the object inferred from the surrounding environment image. The AI processor may obtain the information about the type of the object based on the label and the reliability value output by the AI model. For example, the AI processor may detect the at least one object from the surrounding environment image and classify the at least one object as at least one type of another vehicle, pedestrian, traffic light, traffic sign, or signboard.

The processor 1300 may select any one of the at least one object detected from the surrounding environment image, based on the user input received through the user input interface 1500.

The user input interface 1500 may receive a user input to select any one object through an AR pointing input such as hand tracking, eye tracking, or via an input controller. In an embodiment of the disclosure, the user input interface 1500 may include a gesture sensor for detecting and tracking a position of a hand or a fingertip of the user. In another embodiment of the disclosure, the user input interface 1500 may include an eye tracking sensor for tracking a gaze direction of both eyes of the user and sensing a position of a gaze point to which the gazes of the both eyes converge. In another embodiment of the disclosure, the user input interface 1500 may include an input controller sensor for tracking a position of an input controller mounted on a body part of the user or carried by the user. The input controller sensor may be configured to obtain position coordinates of the input controller by being paired with at least one of an inertial measurement sensor (e.g., gyroscope, accelerometer, or magnetometer), a wireless communication module (e.g., UWB, WiFi, or Bluetooth), or a touch sensor (e.g., touch-sensitive surface) capable of tracking the relative position and/or the absolute position between the input controller and the windshield (see 160 of FIG. 1) of the vehicle.

However, the user input interface 1500 is not limited to receiving only the AR pointing input as described above. In an embodiment of the disclosure, the user input interface 1500 may include a touch sensor for receiving a touch input of the user or a microphone for receiving a voice input of the user.

The processor 1300 may obtain identification information (e.g., ID information) and type information regarding an object selected based on a user input inputted through the user input interface 1500. In an embodiment of the disclosure, the processor 1300 may obtain the identification information and the type information regarding the object selected through the user input, by comparing the detection result with respect to at least one object from the surrounding environment image with the V2X data set regarding the at least one object, received through the communication interface 1200. In an embodiment of the disclosure, the processor 1300 may obtain at least one of license plate information, position information, type information, or expected speed information of an object from the surrounding environment image, and match the obtained information with information included in the V2X data set obtained through the communication interface 1200. The processor 1300 may extract identification information and type information for the object selected through the user input from the information included in the V2X data set, based on a result of the matching. A detailed method, performed by the processor 1300, of obtaining the identification information and the type information regarding the object selected through the user input by using the detection result with respect to the surrounding environment image and the V2X data set will be described in detail with reference to FIGS. 6 to 9.

The processor 1300 may display a user interface (UI) for performing a wireless communication connection with the selected object on the display 1600. In an embodiment of the disclosure, the electronic device 1000 may further include a projector configured to project a virtual image, and the processor 1300 may control the projector to project the virtual image constituting the UI onto the display 1600 configured with an AR HUD, thereby displaying the UI. However, the disclosure is not limited thereto, and in another embodiment of the disclosure, the processor 1300 may display the UI on the display 1600 including at least one of a CID, a navigation device, an instrument panel display, or a front passenger seat display.

The UI displayed on the display 1600 may include a contextual menu UI that provides a customized menu according to the type of the object. In an embodiment of the disclosure, the processor 1300 may display a menu UI that includes a plurality of items selectable for performing a function or an operation determined based on the type of the object. When the type of the object is a vehicle, the menu UI may include an UI related to a plurality of items to receive a user input to perform operations determined based on the type of the object, 'vehicle', and the operations may include sending a message to the vehicle, obtaining vehicle information, or transmitting a danger warning signal. When the type of the object is a pedestrian, the menu UI may include an UI related to a plurality of items to receive a user input to perform operations determined based on the type of the object, 'pedestrian', and the operation may include sending a message, making a call to a phone of the pedestrian, or transmitting a danger warning signal. When the type of the object is a signboard of a restaurant, the menu UI may include an UI related to a plurality of items to receive a user input to perform operations determined based on the type of the object, 'signboard', and the operations may include obtaining restaurant information, ordering from a food menu, or making a reservation.

In an embodiment of the disclosure, the processor 1300 may display UIs in different colors and forms before, during, and after making the wireless communication connection with the object. For example, before connection of the wireless communication with the object, the processor 1300 may display a UI that displays the object in a different color according to the type of the object, without displaying the menu UI. During connection of the wireless communication with the object, the processor 1300 may display a tracking UI 130 (see FIG. 11A) that tracks a position of the object to be connected and indicates the connection state. After the wireless communication with the object is connected, the processor 1300 may display object information UIs 112 to 115 (see FIG. 12) indicating object information including at least one of profile information, a wireless communication connection signal strength, a battery level, or a moving speed of the object as well as the UI indicating the plurality of items for performing the function or operation determined according to the type of the object. A detailed example where the processor 1300 displays a different UI according to a state of wireless communication connection with an object will be described in detail with reference to FIGS. 10 to 12.

In an embodiment of the disclosure, the processor 1300 may display a focusing UI 140 (see FIGS. 13A to 13C) including a figure or a symbol encompassing the image corresponding to the object selected by the user input in the surrounding environment image. The processor 1300 may display the focusing UI 140 in a different color according to the moving speed of the object. The focusing UI 140 will be described in detail with reference to FIGS. 13A to 13C.

In an embodiment of the disclosure, the processor 1300 may display an advertisement image or an introduction image received from the object. In an embodiment of the disclosure, the processor 1300 may display a menu UI related to the object after displaying a content image 142 (see FIG. 14) including the advertisement image or the introduction image of the object. A detailed example where the processor 1300 displays the advertisement content or the introduction image of the object will be described in detail with reference to FIG. 14.

The processor 1300 may control the communication interface 1200 to perform wireless communication connection with the object by using the identification information of the object. The processor 1300 may perform bidirectional V2X communication with the object through the communication interface 1200.

The display 1600 may include at least one of an AR HUD, a transparent display formed on a windshield of the vehicle, a CID, a navigation device, an instrument panel display, or a front passenger seat display. When the display 1600 is implemented with an AR HUD, the display 1600 may display a UI by projecting the virtual image on the transparent display provided on the windshield of the vehicle through the projector.

When the display 1600 includes at least one of the CID, the navigation device, the instrument panel display, or the front passenger seat display, the display 1600 may be implemented as at least one of a liquid crystal display (LCD), a thin film transistor (TFT) LCD, an organic light-emitting diode (OLED), a flexible display, a three-dimensional (3D) display, or an electronic-ink (e-ink) display. In this case, the display 1600 may implement a touch screen by implementing a mutual layer structure with a touch sensor or being integrated with the touch sensor.

Figure 3:
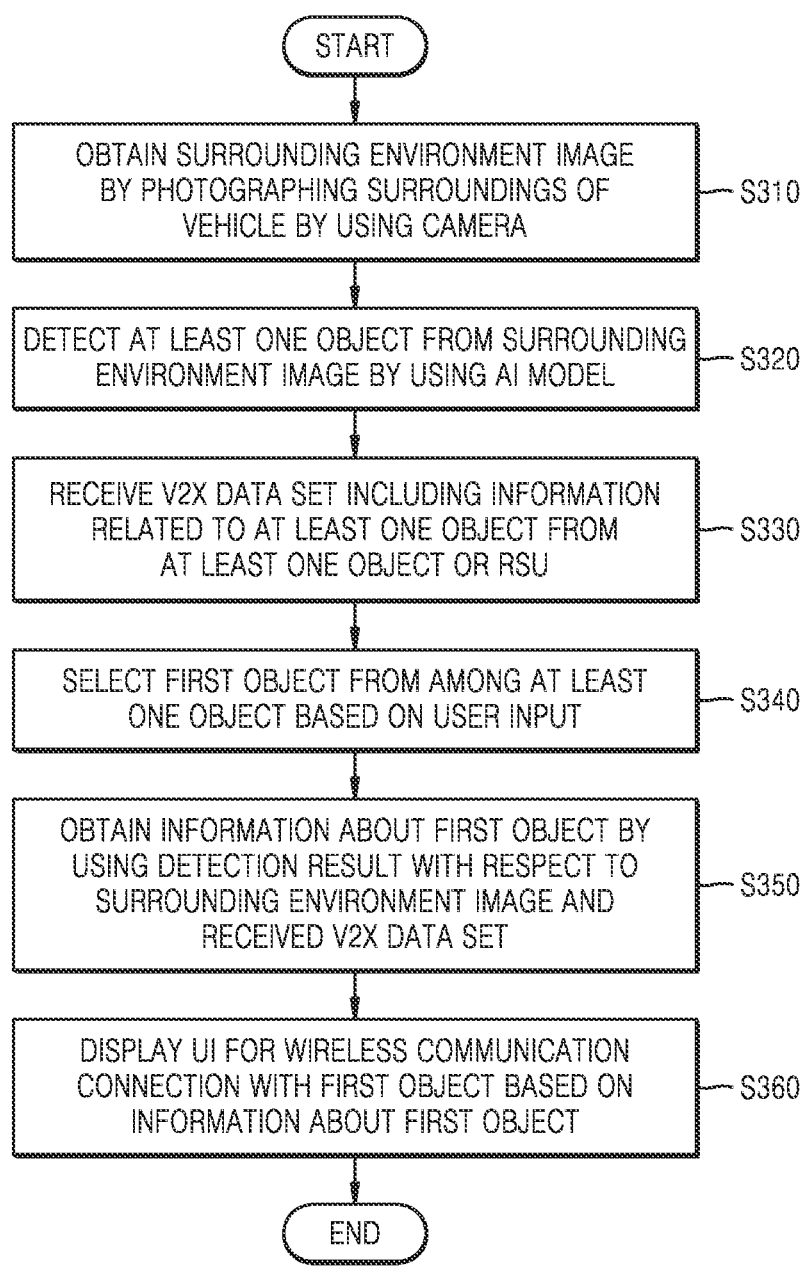
FIG. 3 is a flowchart of an operating method of an electronic device according to an embodiment of the disclosure.

FIG. 3 is a flowchart of an operating method of the electronic device 1000 according to an embodiment of the disclosure.

In operation S310, the electronic device 1000 may obtain a surrounding environment image by photographing surroundings of the vehicle by using a camera. In an embodiment of the disclosure, the electronic device 1000 may obtain the surrounding environment image including objects such as another vehicle, pedestrian, traffic light, traffic sign, signboard, or billboard around the vehicle, by using the camera.

In operation S320, the electronic device 1000 may detect at least one object from the surrounding environment image by using an AI model. The AI model may include a deep neural network model trained to detect objects from the surrounding environment image and to classify the object by type. The AI model may be stored in the memory 1400 (see FIG. 2) of the electronic device 1000, but the disclosure is not limited thereto.

The AI model may include a deep neural network model including model parameters trained by applying several tens of thousands to hundreds of millions of images as input data and applying a label to an object included in the image as the output ground truth. The deep neural network model may include, for example, at least one of a CNN, an RNN, an RBM, a DBN, a BRDNN, or deep Q-networks. However, the AI model may not include only the deep neural network model, but may also include at least one of an SVM, linear regression, logistic regression, Naive Bayes, a random forest, a decision tree, or a k-nearest neighbor algorithm.

The electronic device 1000 may detect objects such as the other vehicle, the pedestrian, the traffic light, the traffic sign, the signboard, or the billboard from the surrounding environment image, by using the AI model.

In operation S330, the electronic device 1000 may receive the V2X data set including information related to at least one object from the at least one object or an RSU. In an embodiment of the disclosure, the electronic device 1000 may receive the V2X data set from the at least one object or the RSU through the communication interface 1200 (see FIG. 2). The V2X data set may include the information related to the at least one object, e.g., at least one of identification information (ID information), reception date, license plate information, type information, position information, direction information, or speed information. The information included in the V2X data set will be described in detail with reference to FIG. 5.

In operation S340, the electronic device 1000 may select a first object in the at least one object, based on the user input. The electronic device 1000 may receive a user input to select the first object included in the surrounding environment image. In an embodiment of the disclosure, the electronic device 1000 may receive an AR pointing input through at least one of a hand tracking sensor, an eye tracking sensor, or via an input controller included in the user input interface 1500 (see FIG. 2). In an embodiment of the disclosure, the electronic device 1000 may select the first object from an image corresponding to the at least one object displayed on the AR HUD, according to the user input.

However, the disclosure is not limited thereto, and the electronic device 1000 may receive a touch input to select the first object in the surrounding environment image displayed on device such as the navigation device, the CID, the instrument panel display, or the front passenger seat display. In another embodiment of the disclosure, the electronic device 1000 may receive a voice input to utter the type or the position of the first object to select the first object. The electronic device 1000 may select the first object based on the touch input or the voice input.

In operation S350, the electronic device 1000 may obtain information about the first object by using a detection result with respect to the surrounding environment image and the received V2X data set. In an embodiment of the disclosure, the electronic device 1000 may obtain the identification information and the type information regarding the first object, by comparing the detection result with respect to the at least one object from the surrounding environment image with the V2X data set regarding the at least one object, received through the communication interface 1200 (see FIG. 2). In an embodiment of the disclosure, the electronic device 1000 may obtain at least one of license plate information, position information, type information, or expected speed information of an object from the surrounding environment image, and match the obtained information with information included in the V2X data set obtained through the communication interface 1200. The electronic device 1000 may extract the identification information and the type information regarding the object selected through the user input from the information included in the V2X data set, based on the result of the matching.

In operation S360, the electronic device 1000 may display a UI for the wireless communication connection with the first object, based on the information about the first object. In an embodiment of the disclosure, the electronic device 1000 may display the UI on the AR HUD as the UI for the wireless communication connection with the first object, by projecting the virtual image on the windshield of the vehicle by using the projector. However, the disclosure is not limited thereto, and in another embodiment of the disclosure, the electronic device 1000 may display the UI on at least one of the CID, the navigation device, the instrument panel display, or the front passenger seat display of the vehicle.

The UI for the wireless communication connection with the first object may include a menu UI selectable by the user to perform functions or operations determined based on the type of the first object. In an embodiment of the disclosure, the menu UI may include a UI for a plurality of items indicating functions or operations that may be performed on the first object. When the type of the object is a vehicle, the menu UI may include an UI related to a plurality of items to receive a user input to perform operations determined based on the type of the object, 'vehicle', and the operations may include sending a message to the vehicle, obtaining vehicle information, or transmitting a danger warning signal. When the type of the object is a pedestrian, the menu UI may include an UI related to a plurality of items to receive a user input to perform operations determined based on the type of the object, 'pedestrian', and the operations may include sending a message, making a call to the phone of the pedestrian, or transmitting a danger warning signal. When the type of the object is a signboard of a restaurant, the menu UI may include an UI related to a plurality of items to receive a user input to perform operations determined based on the type of the object, 'signboard', and the operations may include obtaining restaurant information, ordering from a food menu, or making a reservation.

In an embodiment of the disclosure, the electronic device 1000 may display not only a menu UI, but also an object information UI indicating object information including at least one of profile information, wireless communication connection signal strength, battery level, or moving speed of the first object. The electronic device 1000 may display the object information of the first object with characters, numbers, symbols, icons, etc.

In an embodiment of the disclosure, the electronic device 1000 may display UIs in different colors and forms before, during, and after making the wireless communication connection with the first object.

In an embodiment of the disclosure, the electronic device 1000 may display the at least one object detected from the surrounding environment image in a different color according to the type of the object.

Figure 4:
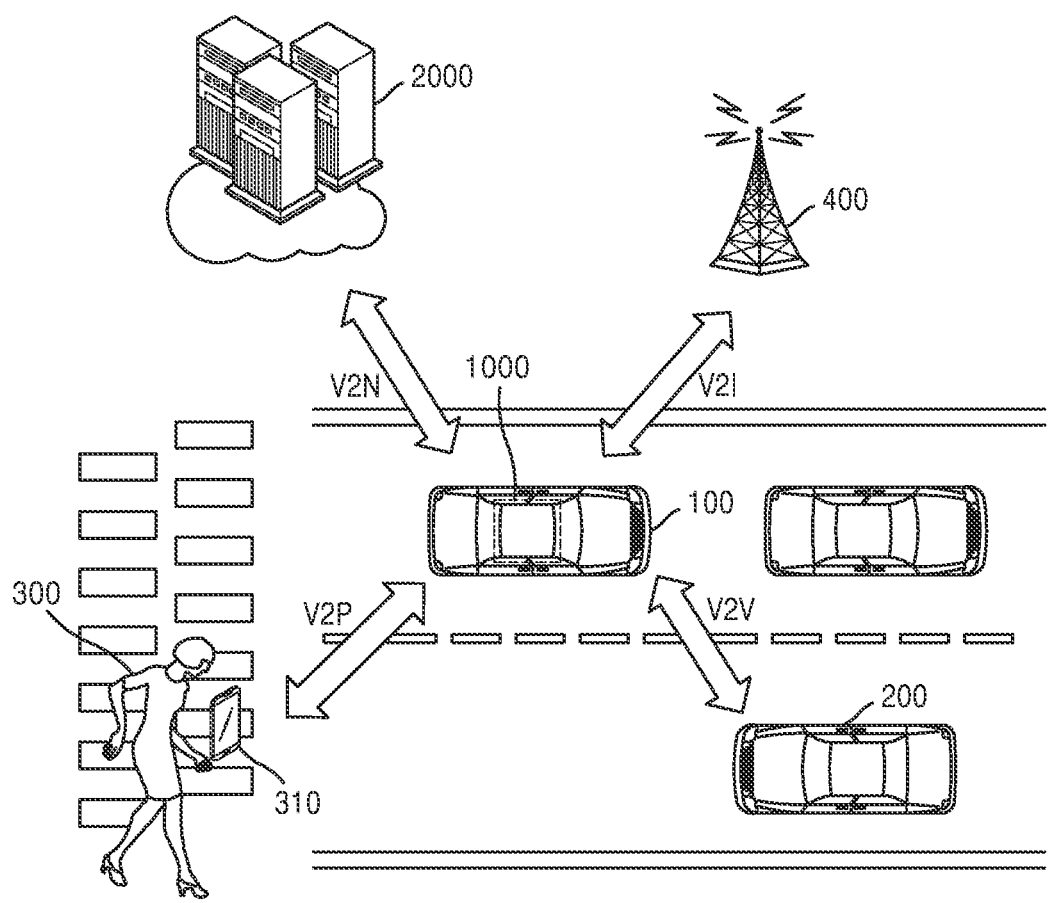
FIG. 4 is a view for describing an operation, performed by an electronic device according to an embodiment of the disclosure, of receiving a vehicle to everything (V2X) data set through V2X connections with objects around a vehicle.

FIG. 4 is a view for describing an operation, performed by the electronic device 1000 according to an embodiment of the disclosure, of receiving a V2X data set through V2X connections with objects around a vehicle.

Referring to FIG. 4, the electronic device 1000 may be mounted on a vehicle 100, and it may receive a V2X data set including information related to objects 200 and 310 from at least one of the objects 200 and 310, an RSU 400, or a server 2000 around the vehicle 100 or communicatively connected to the vehicle 100.

In an embodiment of the disclosure, the electronic device 1000 may receive a V2X data set of the other vehicle 200 from a wireless communication device mounted on the other vehicle 200 by performing V2V communication with the other vehicle 200 located around the vehicle 100. In an embodiment of the disclosure, the electronic device 1000 may receive a V2X data set including information related to the pedestrian 300 from the mobile device 310 by performing V2P communication with the mobile device 310 owned or carried by the pedestrian 300. In an embodiment of the disclosure, the electronic device 1000 may receive a V2X data set regarding objects (e.g., the other vehicle 200 and the pedestrian 300) around the vehicle 100 from the RSU 400 by performing V2I communication with the RSU 400. The RSU 400 may receive a V2X data set regarding at least one object located or moving in a preset range from the position where the RSU 400 is installed, and establish a database. The RSU 400 may transmit the established V2X database to objects in the preset range. In an embodiment of the disclosure, the electronic device 1000 may receive a V2X data set regarding objects (e.g., the other vehicle 200 and the pedestrian 300) around the vehicle 100 from the server 2000 by performing V2S communication with the external server 2000.

The information regarding the object, included in the V2X data set, will be described in detail with reference to FIG. 5.

Figure 5:
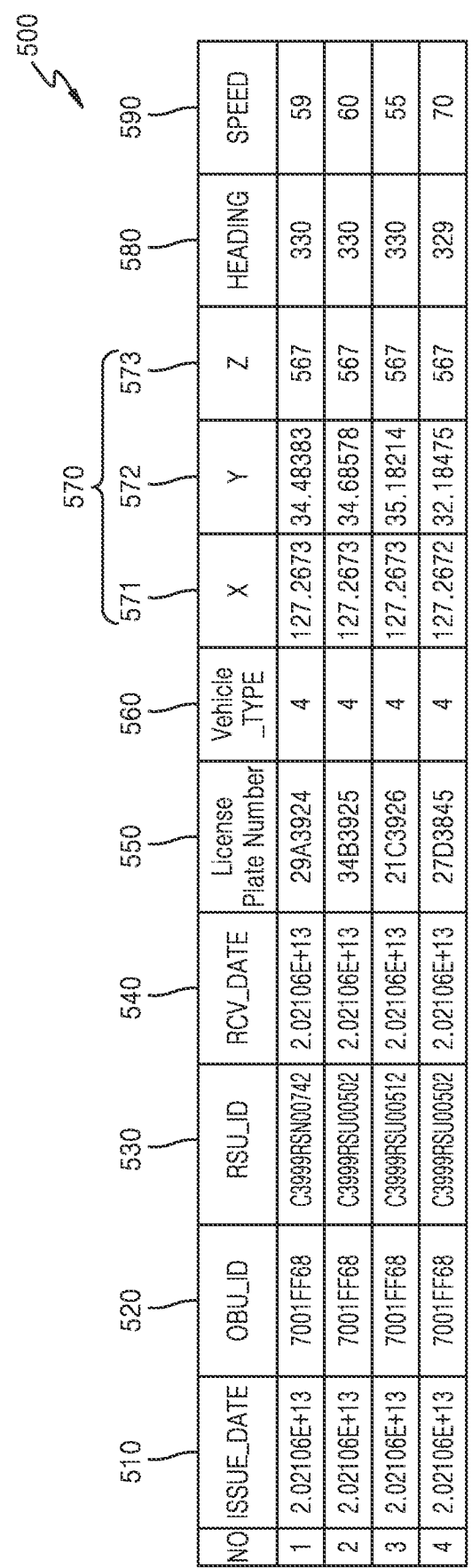
FIG. 5 is table showing information included in a V2X data set received by an electronic device according to an embodiment of the disclosure from objects around a vehicle.

FIG. 5 is table showing information included in a V2X data set 500 received by the electronic device 1000 according to an embodiment of the disclosure from objects around a vehicle.

Referring to FIG. 5, the V2X data set 500 may include date information 510, OBU identification information 520, RSU identification information 530, reception date information 540, license plate information 550, vehicle type information 560, position coordinate information 570, direction information 580, and speed information 590, which are related to at least one object around the vehicle. FIG. 5 merely shows an example of the V2X data set 500, but the disclosure is not so limited. In an embodiment of the disclosure, the V2X data set 500 may not include at least one of the plurality of pieces of information shown in FIG. 5, and may further include a plurality of pieces of information not shown in FIG. 5.

The date information 510 may indicate information about the current date. In the embodiment of the disclosure shown in FIG. 5, the date information 510 represents Jun. 13, 2021.

The OBU identification information 520 may indicate identification information of a OBU that is a V2X communication terminal in the vehicle. In the embodiment of the disclosure shown in FIG. 5, the OBU identification information 520 may be 7001FF68.

The RSU identification information 530 may indicate identification information of an RUS having received the V2X data set 500. In the embodiment of the disclosure shown in FIG. 5, the RSU identification information 530 may differ from object to object, but the disclosure is not limited thereto.

The reception date information 540 indicates information about the date on which the V2X data set 500 is received. In the embodiment of the disclosure shown in FIG. 5, the reception date information 540 represents Jun. 13, 2021.

The license plate information 550 indicates information about the license plate of the vehicle for objects that are vehicles. Referring to the license plate information 550 in the embodiment of the disclosure shown in FIG. 5, a license plate of a first other vehicle is 29A3924, a license plate of a second other vehicle is 3463925, a license plate of a third other vehicle is 21C3926, and a license plate of a fourth other vehicle is 27D3845.

The vehicle type information 560 may indicate an identification information corresponding to the type of the vehicle for objects that are vehicles. The type of the vehicle may be classified into, for example, passenger car, sport-utility vehicle (SUV), multi-utility vehicle (MPV), pickup truck, commercial vehicle, etc., but the disclosure is not limited thereto. In the embodiment of the disclosure shown in FIG. 5, '4' may be an identification number corresponding to the passenger car, but the disclosure is not limited thereto.

Although not shown in FIG. 5, the vehicle type information 560 may be replaced with object type information. The object type information, which is information indicating the types of the objects 200 and 300 (see FIG. 4) around the vehicle 100 (see FIG. 4), may include, e.g., other vehicles, pedestrian, traffic light, traffic sign, signboard, billboard, etc.

The position coordinate information 570 indicates 3D position coordinate information of the object. The position coordinate information 570 indicates an X coordinate 571, a Y coordinate 572, and a Z coordinate 573. In an embodiment of the disclosure, the position coordinate information 570 may include latitude and longitude information obtained from GPS information.

The direction information 580 may indicate information about a direction the object is heading.

The moving speed information 590 may indicate information about the moving speed of the object.

The electronic device 1000 may obtain identification information and type information of the object by using information obtained from the V2X data set 500 and the surrounding environment image, and display a UI for a bidirectional V2X communication connection with the object. A detailed example thereof will be described in detail with reference to FIGS. 6 to 9.

Figure 6:
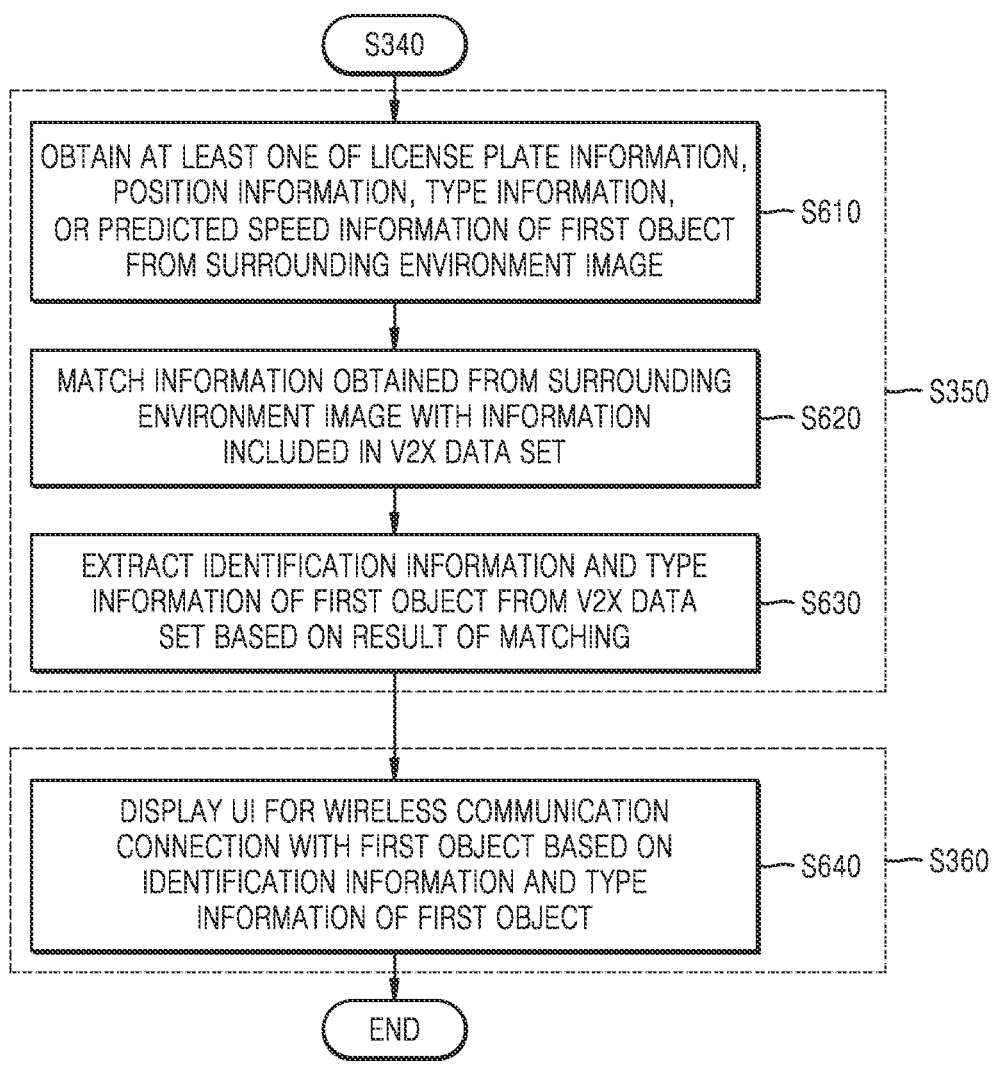
FIG. 6 is a flowchart of a method, performed by an electronic device according to an embodiment of the disclosure, of performing wireless communication connection with an object around a vehicle.

FIG. 6 is a flowchart of a method, performed by the electronic device 1000 according to an embodiment of the disclosure, of performing wireless communication connection with an object around a vehicle.

Operations S610 to S630 shown in FIG. 6 are operations that implement operation S350 shown in FIG. 3. Operation S610 may be performed after operation S340 shown in FIG. 3 is performed. Operation S640 shown in FIG. 6 may be an operation that implement operation S360 shown in FIG. 3.

In operation S610, the electronic device 1000 may obtain at least one of license plate information, position information, type information, or expected speed information of the first object from the surrounding environment image.

The electronic device 1000 may detect the license plate of another vehicle from the surrounding environment image of the surroundings of the vehicle, obtained using the camera. In an embodiment of the disclosure, the electronic device 1000 may detect the other vehicle and the license plate thereof from the surrounding environment image through inference using the AI model. However, the disclosure is not limited thereto, and the electronic device 1000 may detect the other vehicle and the license plate thereof from the surrounding environment image through other known image processing techniques. The electronic device 1000 may obtain license plate information of the other vehicle from the detected license plate. In an embodiment of the disclosure, the electronic device 1000 may identify characters and numbers of the license plate information of the other vehicle from the license plate, by using optical character recognition (OCR) or machine learning.

The electronic device 1000 may obtain position information of the object detected from the surrounding environment image. In an embodiment of the disclosure, the electronic device 1000 may calculate the distance and direction between the object detected from the surrounding environment image and the vehicle on which the electronic device 1000 is mounted. The electronic device 1000 may obtain information about the distance and the direction between the vehicle and the object by using, for example, an image processing technique, but the disclosure is not limited thereto. In another example, the electronic device 1000 may predict the distance and the direction between the vehicle and the object, by using a deep neural network model. The electronic device 1000 may predict the latitude and the longitude of the object, based on information about the distance and the direction between the vehicle and the object and position information of the vehicle obtained through a GPS, etc.

The electronic device 1000 may obtain information about the type of the object detected from the surrounding environment image. In an embodiment of the disclosure, the electronic device 1000 may detect the object from the surrounding environment image by using an AI model, and classify the object by type. The AI model may include a deep neural network model trained to detect the object from the surrounding environment image and to classify the detected object by type. The deep neural network model may include, for example, at least one of a CNN, an RNN, an RBM, a DBN, a BRDNN, or deep Q-networks. However, the AI model may not include only the deep neural network model, but may also include at least one of an SVM, linear regression, logistic regression, Naive Bayes, a random forest, a decision tree, or a k-nearest neighbor algorithm. The electronic device 1000 may classify the object detected from the surrounding environment image into at least one of the other vehicle, the pedestrian, the traffic light, the traffic sign, the signboard, or the billboard, by using the AI model.

The electronic device 1000 may track the object in the surrounding environment image over time, and obtain changes in the position of the object at various times, thus predicting the speed of the object. In an embodiment of the disclosure, the electronic device 1000 may calculate the difference between a first position of the object at a first timepoint and a second position of the object at a second timepoint in the surrounding environment image, and predict the speed of the object by dividing the calculated difference by a time interval between the first timepoint and the second timepoint.

In operation S620, the electronic device 1000 may match information of the object obtained from the surrounding environment image to information included in the V2X data set. In an embodiment of the disclosure, the electronic device 1000 may match license plate information of the object identified from the surrounding environment image to the license plate information 550 (see FIG. 5) included in the V2X data set 500 (see FIG. 5). In an embodiment of the disclosure, the electronic device 1000 may match position information of the object obtained from the surrounding environment image to the position coordinate information 570 (see FIG. 5) included in the V2X data set 500. In an embodiment of the disclosure, the electronic device 1000 may match type information of the object detected from the surrounding environment image to the vehicle type information 560 (see FIG. 5) included in the V2X data set 500. In an embodiment of the disclosure, the electronic device 1000 may match the speed of the object predicted from the surrounding environment image to the speed information 590 (see FIG. 5) included in the V2X data set 500.

In operation S630, the electronic device 1000 may extract the identification information and the type information of the first object from the V2X data set 500, based on the result of the matching.

In an embodiment of the disclosure, the electronic device 1000 may compare the license plate identified from the surrounding environment image with the license plate information 550 of the V2X data set 500, and extract the identification information and the type information of the object matched to the same license plate as the identified license plate, as the comparison result, from the V2X data set 500. A detailed embodiment of the disclosure in which the electronic device 1000 extracts the identification information and the type information of the object from the V2X data set 500 by using the license plate information will be described in detail with reference to FIG. 7.

In an embodiment of the disclosure, the electronic device 1000 may compare the position information of the object predicted from the surrounding environment image with the position coordinate information 570 of the V2X data set 500, and extract the identification information and the type information of the matched coordinate information from the V2X data set 500. A detailed embodiment of the disclosure in which the electronic device 1000 extracts the identification information and the type information of the object from the V2X data set 500 by using the result of the matching with respect to the position information of the object will be described in detail with reference to FIG. 8.

In an embodiment of the disclosure, the electronic device 1000 may compare the type of the object detected from the surrounding environment image with the vehicle type information 560 included in the V2X data set 500, and extract the identification information of the object having the same type as the detected type of the object, as the comparison result, from the V2X data set 500.

In an embodiment of the disclosure, the electronic device 1000 may compare predicted speed information of the object obtained from the surrounding environment image with the speed information 590 included in the V2X data set 500, and extract the identification information and the type information of the object moving at the same speed as the predicted speed information, as the comparison result, from the V2X data set 500. A detailed embodiment of the disclosure in which the electronic device 1000 predicts the moving speed of the object at a plurality of timepoints over time and extracts the identification information and the type information of the object from the V2X data set 500 will be described in detail with reference to FIG. 9.

In operation S640, the electronic device 1000 may display a UI for the wireless communication connection with the first object, based on the identification information and the type information of the first object.

Figure 7:
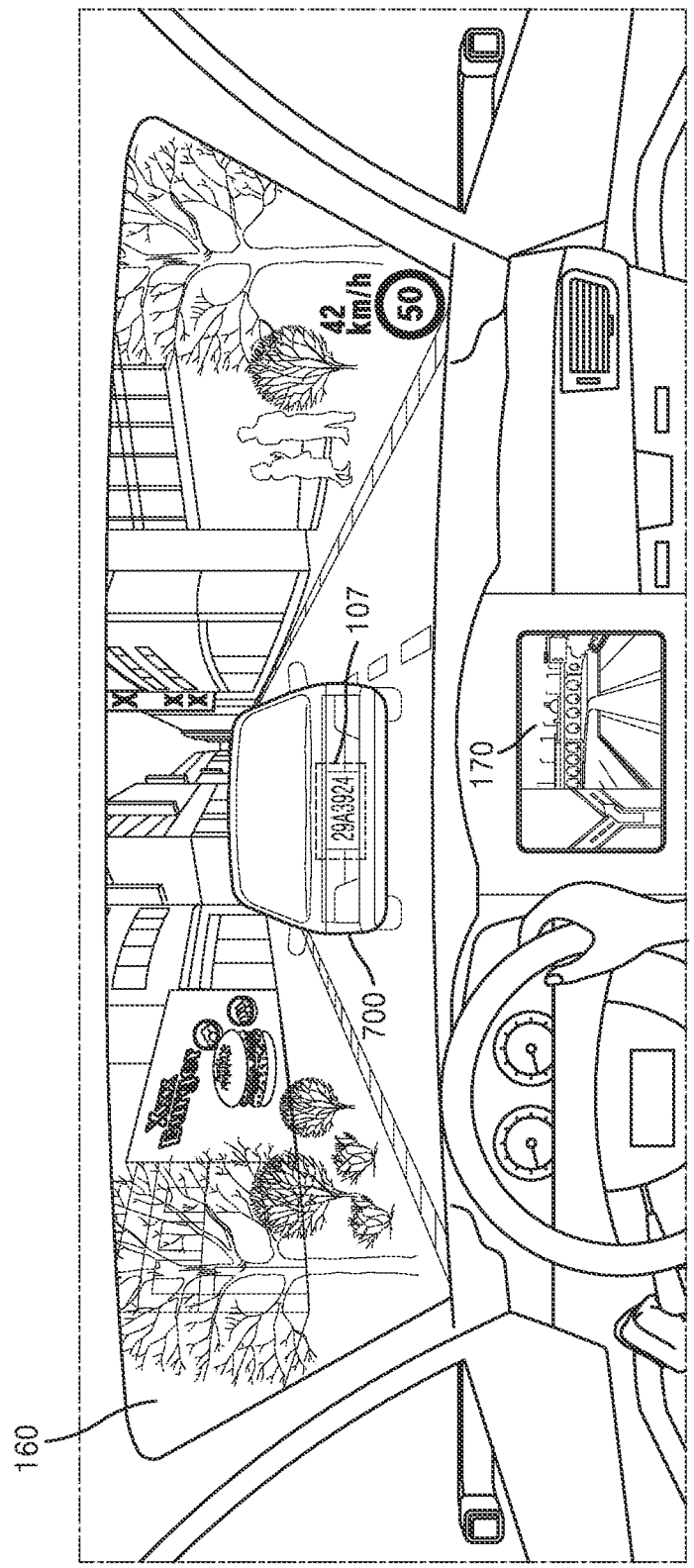
FIG. 7 is a view for describing an operation, performed by an electronic device according to an embodiment of the disclosure, of obtaining identification information of another vehicle based on information about a license plate of the other vehicle.

FIG. 7 is a view for describing an operation, performed by the electronic device 1000 according to an embodiment of the disclosure, of obtaining identification information of another vehicle 700 based on information about the license plate 710 of the other vehicle 700.

Referring to FIG. 7, the electronic device 1000 may detect the other vehicle 700 from a surrounding environment image displayed on the windshield 160 of the vehicle. The surrounding environment image may be obtained by photographing the other vehicle 700 moving around the vehicle by using the camera.

The electronic device 1000 may detect the license plate 710 of the other vehicle 700 from the surrounding environment image. In an embodiment of the disclosure, the electronic device 1000 may detect the other vehicle 700 and the license plate 710 thereof from the surrounding environment image through inference using the AI model. However, the disclosure is not limited thereto, and the electronic device 1000 may detect the other vehicle 700 and the license plate 710 thereof from the surrounding environment image through other known image processing techniques. The electronic device 1000 may obtain license plate information of the other vehicle 700 from the detected license plate 710. In an embodiment of the disclosure, the electronic device 1000 may identify characters and numbers of the license plate information of the other vehicle 700 from the license plate, by using OCR or machine learning. In the embodiment of the disclosure shown in FIG. 7, the electronic device 1000 may identify license plate information including characters and numbers, 29A3924, from the license plate 710 of the other vehicle 700.

The electronic device 1000 may match the identified license plate information of the other vehicle 700 to the license plate information 550 (see FIG. 5) of the V2X data set 500 (see FIG. 5). Referring to FIG. 5, an object having information '29A3924' of the license plate information 550 of the V2X data set 500 is the first object. The electronic device 1000 may identify the first object having the same license plate information (e.g., 29A3924) by comparing the license plate information of the other vehicle 700 identified from the surrounding environment image with the V2X data set 500.

The electronic device 1000 may extract the identification information and the type information of the identified first object from the V2X data set 500. Referring to the embodiment of the disclosure shown in FIG. 5, the electronic device 1000 may obtain the OBU identification information 520 (see FIG. 5), the RSU identification information 530 (see FIG. 5), the reception date information 540 (see FIG. 5), and the vehicle type information 560 (see FIG. 5) of the first object from the V2X data set 500. However, the disclosure is not limited thereto, and the electronic device 1000 may obtain the position information 570 (see FIG. 5), the direction information 580 (see FIG. 5), and the speed information 590 (see FIG. 5) of the first object from the V2X data set 500.

The electronic device 1000 may display a UI for wireless communication connection with the first object, by using the identification information and the type information of the first object extracted from the V2X data set 500.

Figure 8:
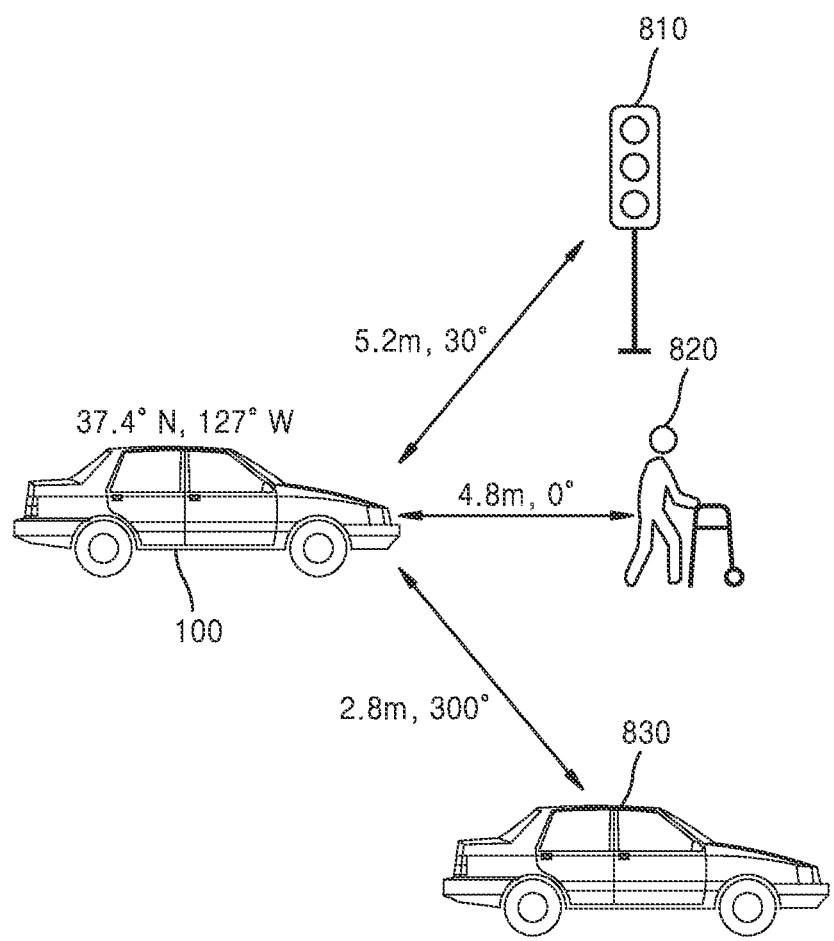
FIG. 8 is a view for describing an operation, performed by an electronic device according to an embodiment of the disclosure, of obtaining identification information of an object based on a position relationship between a vehicle and the object.

FIG. 8 is a view for describing an operation, performed by the electronic device 1000 according to an embodiment of the disclosure, of obtaining identification information of objects 810, 820, and 830 based on position relationships among the vehicle 100 and the objects 810, 820, and 830.

Referring to FIG. 8, position information of a plurality of objects 810, 820, and 830 may be obtained from a surrounding environment image obtained by photographing the plurality of objects 810, 820, and 830 using the camera. In an embodiment of the disclosure, the electronic device 1000 may calculate the distances and directions between the plurality of objects 810, 820, and 830 detected from the surrounding environment image and the vehicle 100 on which the electronic device 1000 is mounted. The electronic device 1000 may obtain information about the distances and directions between the vehicle 100 and each of the plurality of objects 810, 820, and 830 by using, e.g., an image processing technique. However, the disclosure is not limited thereto, and the electronic device 1000 may predict the distances and direction between the vehicle 100 and the plurality of objects 810, 820, and 830 by using a deep neural network model. In the embodiment of the disclosure shown in FIG. 8, the electronic device 1000 may predict a distance of about 5.2 m and a direction of about 30° between the vehicle 100 and a first object 810 from the surrounding environment image. Likewise, the electronic device 1000 may predict a distance of about 4.8 m and a direction of about 0° between the vehicle 100 and a second object 820 and a distance of about 2.8 m and a direction of about 300° between the vehicle 100 and a third object 830.

The electronic device 1000 may obtain position coordinate information of the vehicle 100 by using a GPS sensor, etc. In an embodiment of the disclosure, the electronic device 1000 may obtain latitude and altitude information of the vehicle 100 from the GPS sensor included in the vehicle 100 through controller area network (CAN) communication. However, the disclosure is not limited thereto, and the electronic device 1000 may include the GPS sensor and obtain the latitude and altitude information of the vehicle 100 on which the electronic device 1000 is mounted, by using the GPS sensor. In the embodiment of the disclosure shown in FIG. 8, the latitude of the vehicle 100 may be 37.4° N and the altitude may of the vehicle 100 may be about 127° W.

The electronic device 1000 may predict the latitudes and altitudes of the plurality of objects 810, 820, and 830, based on information about the distances and directions between the vehicle 100 and the plurality of objects 810, 820, and 830, and position information (e.g., latitude and altitude information) of the vehicle 100 obtained using the GPS sensor. The electronic device 1000 may compare the predicted position information of the plurality of objects 810, 820, and 830 with the position coordinate information 570 (see FIG. 5) of the V2X data set 500 (see FIG. 5), and extract identification information and type information of the object having the matched coordinate information from the V2X data set 500. Referring to the embodiment of the disclosure shown in FIG. 5 together, when position coordinate information predicted for the first object 810 is predicted as (127.2673, 34.68578, 567), the electronic device 1000 may compare the predicted position coordinate information with the position coordinate information 570 of the V2X data set 500 and obtain the OBU identification information 520 (see FIG. 5), the RSU identification information 530 (see FIG. 5), the reception date information 540 (see FIG. 5), and the vehicle type information 560 (see FIG. 5) of the object having position coordinates that are the same as or similar to the predicted position coordinate information.

FIG. 9 is a view for describing an operation, performed by the electronic device 1000 according to an embodiment of the disclosure, of obtaining identification information of objects 910 and 920 based on a position relationship change of the objects 910 and 920 over time.

Referring to FIG. 9, the electronic device 1000 may obtain the surrounding environment image by photographing the plurality of objects 910 and 920 using the camera. The electronic device 1000 may track the plurality of objects 910 and 920 in the surrounding environment image over time, and obtain in real time position changes of the plurality of objects 910 and 920 over a plurality of timepoints, thus predicting the speeds of the plurality of objects 910 and 920. According to an embodiment of the disclosure shown in FIG. 9, it may be predicted that the distance between the vehicle 100 on which the electronic device 1000 is mounted and the first object 910 at a first timepoint $t_1$ is about 10 m, and the speed of the first object 910 is about 80 km/h. At the first timepoint it may be predicted that the distance between the vehicle 100 and the second object 920 is about 10 m, and the speed of the second object 920 is about 60 km/h. In the embodiment of the disclosure shown in FIG. 9, when the second timepoint $t_2$ is reached, it may be predicted that the distance between the vehicle 100 and the first object 910 is changed to about 30 m and the distance between the vehicle 100 and the second object 920 is changed to about 20 m.

The electronic device 1000 may calculate differences between the distance between the vehicle 100 and each of the plurality of objects 910 and 920 at the timepoint $t_1$ and the distances between the vehicle 100 and each of the plurality of objects 910 and 920 at the timepoint $t_2$, and divide the calculated difference by a time interval $\Delta t$ between the first timepoint $t_1$ and the second timepoint $t_2$, thus predicting a speed change of each of the plurality of objects 910 and 920. In the embodiment of the disclosure shown in FIG. 9, the electronic device 1000 may predict that the distance between the vehicle 100 and the first object 910 is changed from about 10 m to about 30 m at the second timepoint $t_2$, and divide the difference in distance, about 20 m, by the time interval $\Delta t$ between the first timepoint $t_1$ and the second timepoint $t_2$, thus predicting that the speed of the first object 910 is changed to about 85 km/h. In the same manner, the electronic device 1000 may predict that the speed of the second object 920 is changed to about 70 km/h.

The electronic device 1000 may compare how the speed of each of the plurality of objects 910 and 920 change over time with the speed information 590 (see FIG. 5) included in the V2X data set 500 (see FIG. 5), and extract identification information and type information of an object moving at the same speed as the speed of each of the plurality of objects 910 and 920, as the comparison result, from the V2X data set 500. For example, when the predicted speed of the second object 920 at the second timepoint $t_2$ is about 70 km/h, the electronic device 1000 may compare the predicted speed with the speed information 590 of the V2X data set 500 and may obtain the OBU identification information 520 (see FIG. 5), the RSU identification information 530 (see FIG. 5), the reception date information 540 (see FIG. 5), and the vehicle type information 560 (see FIG. 5) of a fourth object moving at the same speed of 70 km/h as the predicted speed, as the comparison result, from the V2X data set 500.

In an embodiment of the disclosure, the electronic device 1000 may obtain, in real time, position information of each of the plurality of objects 910 and 920 at each timepoint as well as speed information of the plurality of objects 910 and 920, which has changed over time, and compare the obtained real-time position information of each of the plurality of objects 910 and 920 with the position coordinate information 570 (see FIG. 5) included in the V2X data set 500. The electronic device 1000 may identify an object corresponding to each of the plurality of objects 910 and 920 from the V2X data set 500 according to the comparison result, and obtain identification information and type information for each of the plurality of objects 910 and 920 from the V2X data set 500. The electronic device 1000 may compare the real-time position information of each of the plurality of objects 910 and 920 as well as the speed information of each of the plurality of objects 910 and 920, predicted at a plurality of timepoints, with information included in the V2X data set 500, thereby improving matching accuracy and accurate identification information and type information for each of the plurality of objects 910 and 920.

Figure 10:
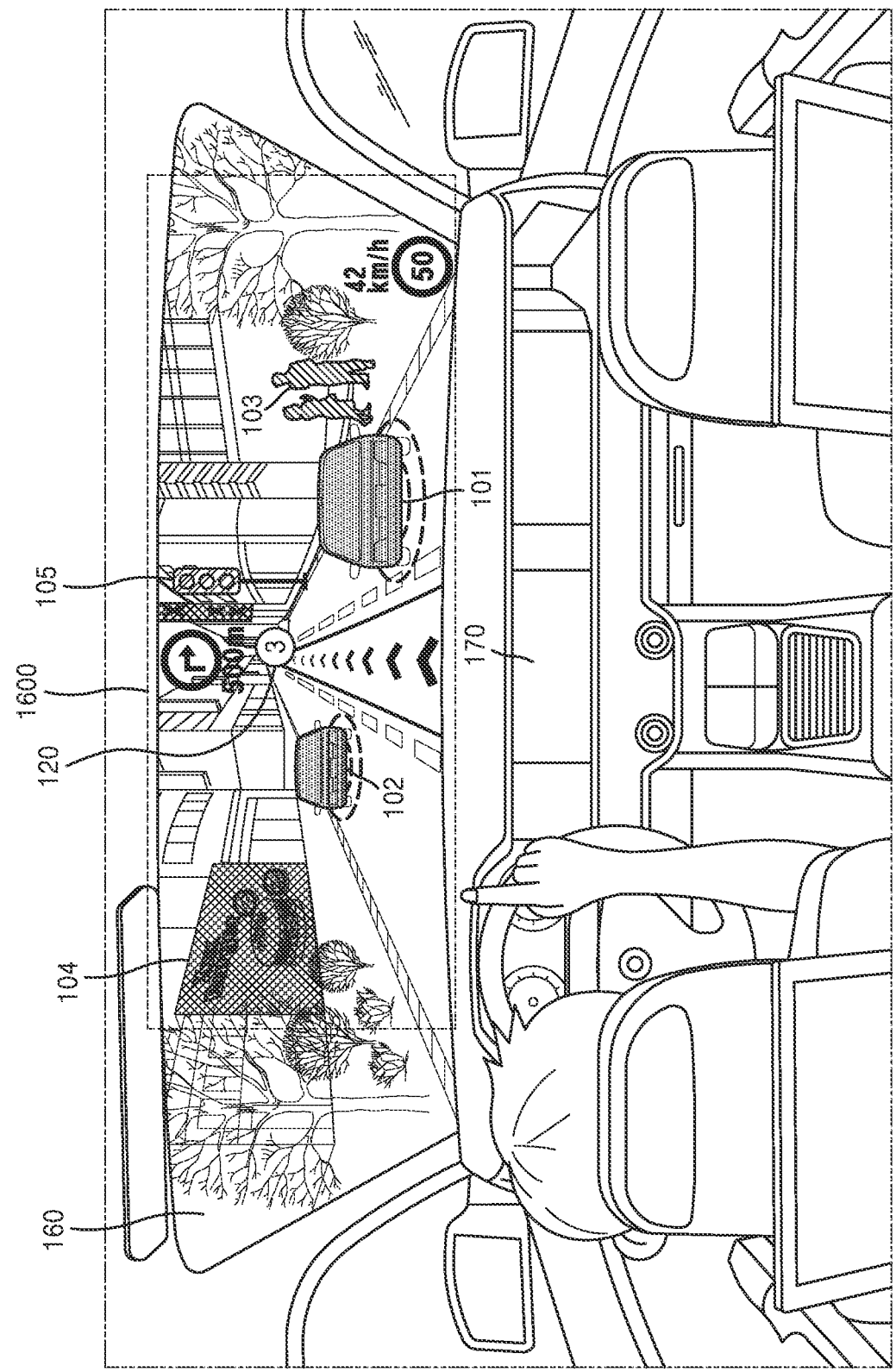
FIG. 10 illustrates an example of a UI displayed by an electronic device according to an embodiment of the disclosure before wireless communication connection with an object is performed.

FIG. 10 illustrates an example of a UI displayed by the electronic device 1000 according to an embodiment of the disclosure before wireless communication connection with an object is performed.

The electronic device 1000 may display UIs in different colors and forms before, during, and after making the wireless communication connection with the object.

Referring to FIG. 10, the electronic device 1000 may display images corresponding to the plurality of objects 101 to 105 and a clustering UI 120 on the display 1600 configured with an AR HUD. In an embodiment of the disclosure, the electronic device 1000 may implement the AR HUD by projecting a virtual image on the windshield 160 of the vehicle using a projector. However, the disclosure is not limited thereto, and in another embodiment of the disclosure, the electronic device 1000 may display the UI on at least one of the CID 170, the navigation device, the instrument panel display, or the front passenger seat display in the vehicle.

The electronic device 1000 may display the image corresponding to each of the plurality of objects 101 to 105 displayed on the display 1600 in a different color according to the type of each of the plurality of objects 101 to 105. In an embodiment of the disclosure, the processor 1300 (see FIG. 2) of the electronic device 1000 may detect the type of each of the plurality of objects 101 to 105 from the surrounding environment image obtained by photographing the plurality of objects 101 to 105 around the vehicle using the camera 1100 (see FIG. 2). The detailed method, performed by the processor 1300, of detecting the type of each of the plurality of objects 101 to 105 from the surrounding environment image is disclosed above in connection with FIGS. 1 and 2, and thus redundant description will be omitted. In an embodiment of the disclosure, the processor 1300 may allocate different colors to the plurality of objects 101 to 105 according to the detected types of the plurality of objects 101 to 105. For example, the processor 1300 may allocate red to the first object 101 and the second object 102 detected as other vehicles, yellow to the third object 103 detected as a pedestrian, green to the fourth object 104 detected as a billboard, and blue to the fifth object 105 detected as a traffic light. The processor 1300 may display the plurality of objects 101 to 105 in different colors according to the types thereof by overlappingly colors to the positions of the plurality of objects 101 to 105 in the surrounding environment image.

In an embodiment of the disclosure, when the display 1600 is implemented as the AR HUD, the processor 1300 may project the images representing the colors allocated to the positions of the plurality of objects 101 to 105 by using the projector. However, the disclosure is not limited thereto, and in another embodiment of the disclosure, when the display 1600 is implemented with at least one of the CID 170, the navigation device, the instrument panel display, or the front passenger seat display, the processor 1300 may display the plurality of objects 101 to 105 in different colors according to the types thereof through image processing.

When a plurality of objects, spaced apart from the position of the vehicle more than a preset distance, overlap one another, the processor 1300 may display the clustering UI 120 representing the number of plural objects. The clustering UI 120 may include an icon expressing the number of overlapping plural objects as a number. When a user input to select the clustering UI 120 is received, the processor 1300 may display a UI including a plurality of items for selecting any one of the plurality of overlapping objects.

When the electronic device 1000 according to the embodiment of the disclosure shown in FIG. 10 displays the plurality of objects 101 to 105, which are wireless communication connection targets, in different colors according to the types thereof, it allows the user to easily recognize and identify the connection target according to the type of the object, such as vehicle, pedestrian, traffic light, billboard, signboard, etc., thereby improving user convenience. Moreover, the electronic device 1000 according to an embodiment of the disclosure may provide a technical effect allowing the user to intuitively recognize the number of plural objects spaced apart from the vehicle more than a preset distance, through the clustering UI 120 representing the number of plural objects.

Figure 11A:
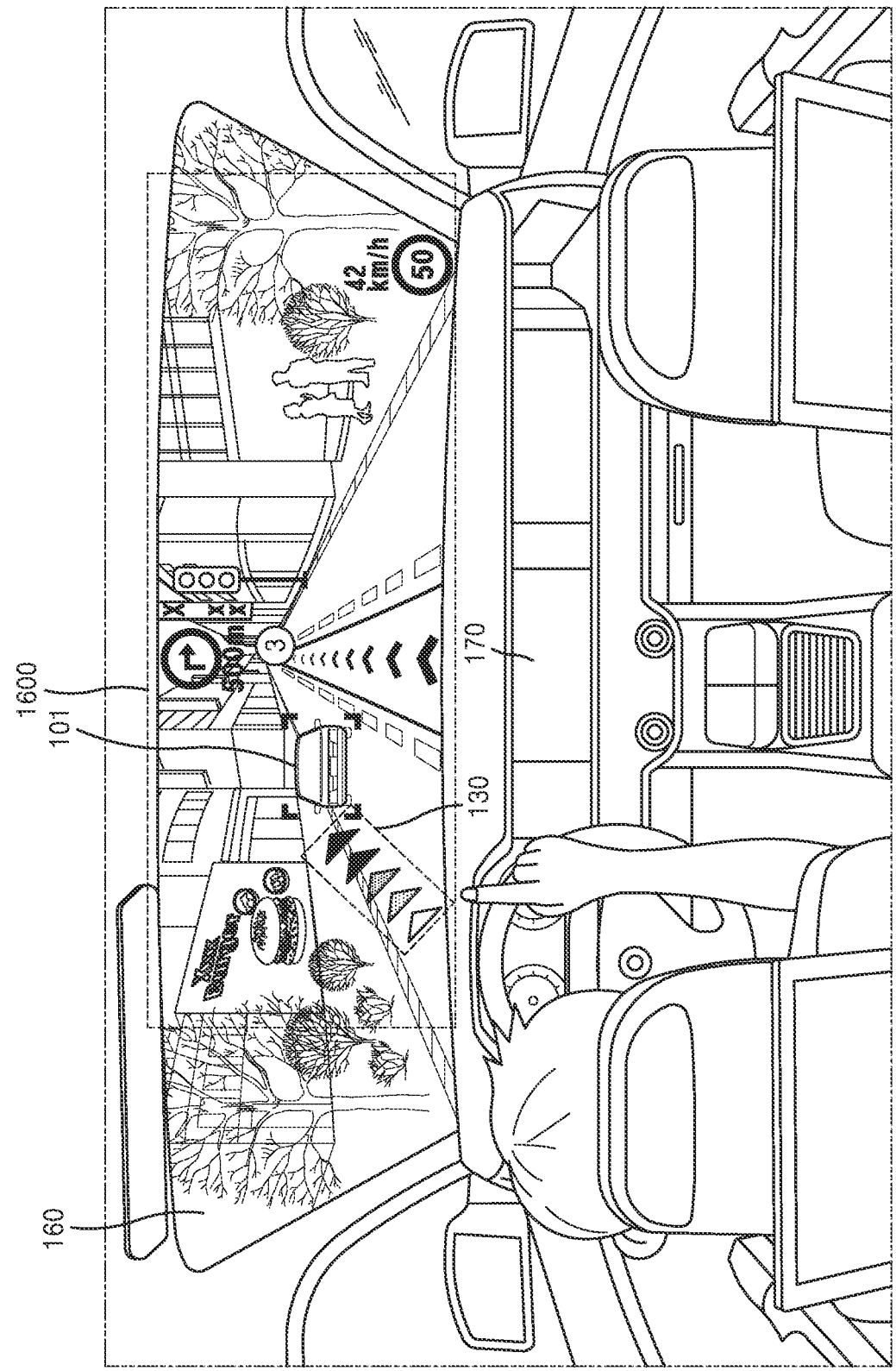
FIG. 11A illustrates an example of a UI displayed by an electronic device according to an embodiment of the disclosure while wireless communication connection with an object is in progress.

FIG. 11A illustrates an example of a UI displayed by the electronic device 1000 according to an embodiment of the disclosure while wireless communication connection with an object is in progress.

Referring to FIG. 11A, a tracking UI 130 representing a connection state with the first object 101 selected by the user may be displayed on the display 1600 configured as the AR HUD. In an embodiment of the disclosure, the electronic device 1000 may implement the AR HUD by projecting a virtual image corresponding to the tracking UI 130 on the windshield 160 of the vehicle using the projector. However, the disclosure is not limited thereto, and in another embodiment of the disclosure, the electronic device 1000 may display the tracking UI 130 on at least one of the CID 170, the navigation device, the instrument panel display, or the front passenger seat display of the vehicle.

In an embodiment of the disclosure, the processor 1300 (see FIG. 2) of the electronic device 1000 may select the first object 101 from among a plurality of objects displayed on the display 1600 based on a user input from the user input interface 1500 (see FIG. 2), and track the position of the selected first object 101. The processor 1300 may display the tracking UI 130 in the form of an arrow indicating the position of the first object 101.

In an embodiment of the disclosure, the processor 1300 may change the color of the tracking UI 130 and display the color-changed tracking UI 130 according to the state of wireless communication connection with the first object 101. A detailed example where the processor 1300 changes the color of the tracking UI 130 and displays the color-changed tracking UI 130 will be described in detail with reference to FIG. 11B.

Figure 11B:
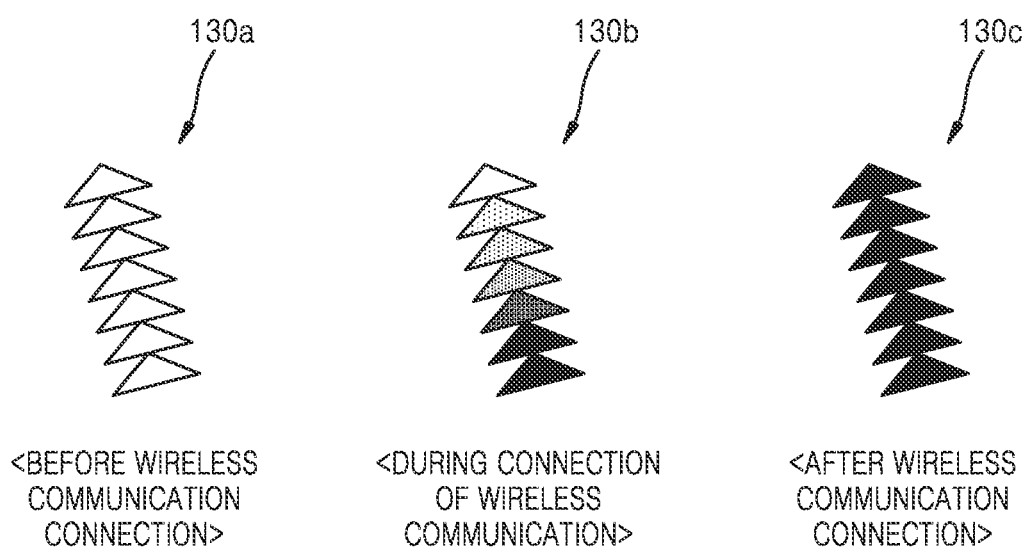
FIG. 11B illustrates an example of a UI changing while wireless communication connection of an electronic device according to an embodiment of the disclosure with an object is in progress.

FIG. 11B illustrates examples of tracking UIs 130*a*, 130*b*, and 130*c* that are alternatingly displayed while wireless communication connection of the electronic device 1000 according to an embodiment of the disclosure with an object is in progress.

Referring to FIG. 11B, the processor 1300 (see FIG. 2) of the electronic device 1000 may change colors of the tracking UIs 130*a*, 130*b*, and 130*c* and display the color-changed tracking UIs 130*a*, 130*b*, and 130*c*, based on the state of wireless communication connection with the first object 101 (see FIG. 11A).

In an embodiment of the disclosure, the processor 1300 may display the tracking UI 130*a* in white or in the form of a colorless empty figure before the wireless communication of the processor 1300 with the first object 101 is connected. The figure constituting the tracking UI 130*a* may have, for example, but not limited to, the shape of a triangle or an arrow.

In an embodiment of the disclosure, during making the wireless communication with the first object 101, the processor 1300 may display the tracking UI 130*b* by gradually changing densities or chroma of colors representing a plurality of figures included in the tracking UI 130*b* as a gradation.

In an embodiment of the disclosure, after the wireless communication of the processor 1300 with the first object is connected, the processor 1300 may display the plurality of figures included in the tracking UI 130*c* in a single color. For example, when the wireless communication connection is completed, the tracking UI 130*c* may be displayed in the same color as the color having the highest density in the colors of the plurality of figures included in the tracking UI 130*b*. However, the disclosure is not limited thereto.

In the embodiment of the disclosure shown in FIGS. 11A and 11B, the electronic device 1000 may provide a technical effect to allow the user to intuitively recognize the state of the wireless communication connection with the first object 101 through the tracking UIs 130*a*, 130*b*, and 130*c*, by changing the colors of the tracking UIs 130*a*, 130*b*, and 130*c* and displaying the color-changed tracking UIs 130*a*, 130*b*, and 130*c*, according to the state of the wireless communication connection with the first object 101. In this way, user convenience may be improved.

Figure 12:
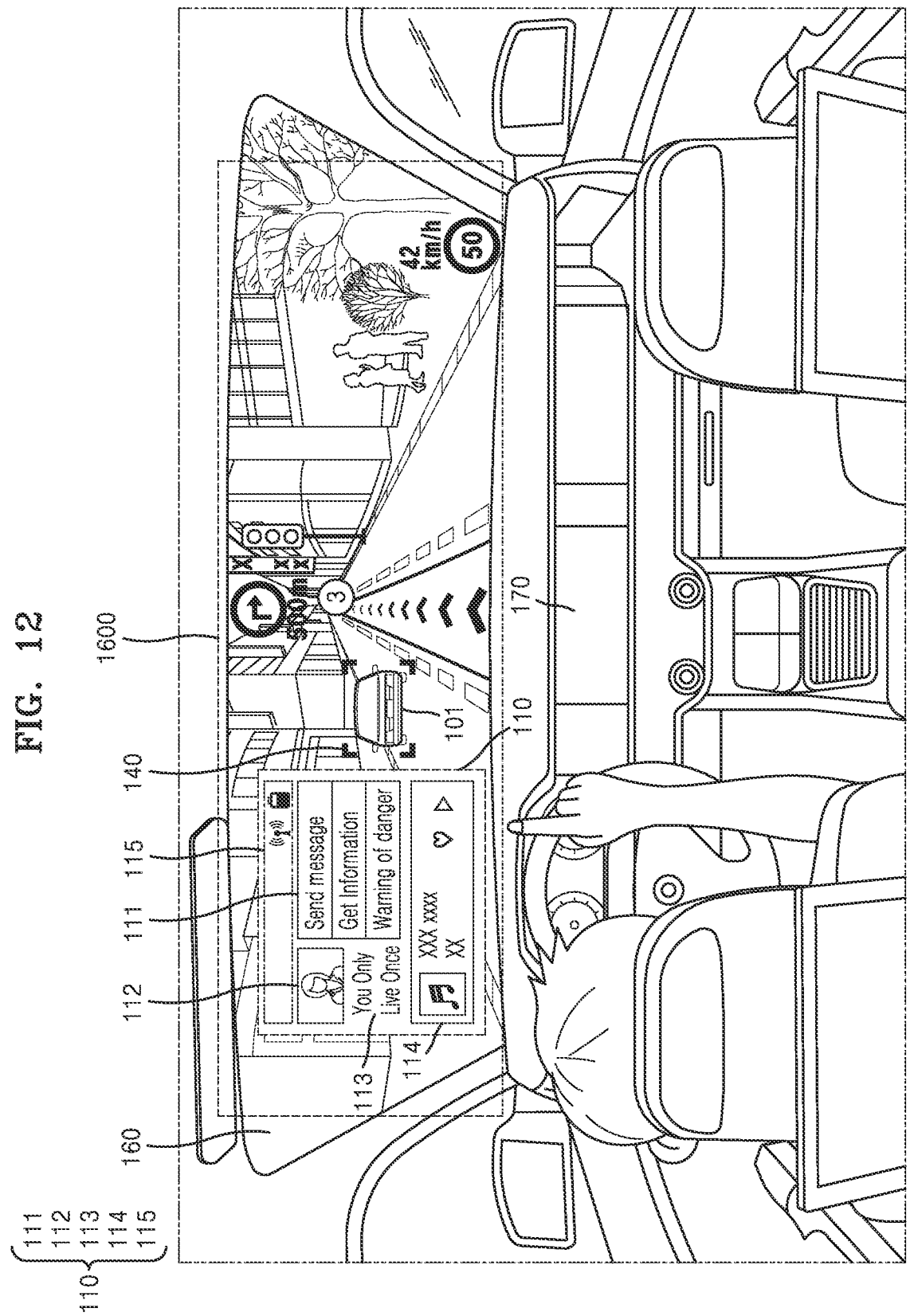
FIG. 12 illustrates an example of a UI displayed by an electronic device according to an embodiment of the disclosure after wireless communication connection with an object is completed.

FIG. 12 illustrates an example of a UI 110 displayed by the electronic device 1000 according to an embodiment of the disclosure after wireless communication connection with the first object 101 is completed.

Referring to FIG. 12, the electronic device 1000 may display the UI 110 representing information about the first object 101 on the display 1600 configured with an AR HUD. In an embodiment of the disclosure, the electronic device 1000 may implement the AR HUD by projecting a virtual image constituting the UI 110 on the windshield 160 of the vehicle using the projector. However, the disclosure is not limited thereto, and in another embodiment of the disclosure, the electronic device 1000 may display the UI 110 on at least one of the CID 170, the navigation device, the instrument panel display, or the front passenger seat display in the vehicle.

The processor 1300 of the electronic device 1000 may display the UI 110 related to the first object 101 in a position adjacent to the position where the first object 101 is displayed. The UI 110 may be a contextual menu UI that provides a customized menu according to the type of the first object 101. The UI 110 may include a menu UI 111 representing functions or operations that may be performed for the first object 101 and object information UIs 112 to 115 representing profile information and state information of the first object 101.

The menu UI 111 may include a plurality of items for receiving a user input to select a function or an operation that may be performed for the first object 101 on which the wireless communication connection is performed. In the embodiment of the disclosure shown in FIG. 12, the type of the first object 101 is vehicle, and the menu UI 111 may include a plurality of items for receiving a user input to perform at least one of operations determined based on that the type of the first object 101 is a vehicle, and the operations may be sending a message to the vehicle, obtaining vehicle information, or transmitting a danger warning signal. The user may select any one of the plurality of items, and the electronic device 1000 may perform a function or an operation corresponding to the item selected by the user input.

Unlike the embodiment of the disclosure shown in FIG. 12, when the type of the first object 101 is a pedestrian, the menu UI 111 may include a plurality of items for receiving a user input to perform operations that may be performed for the pedestrian, and the operations may be sending a message, making a call to a phone of the pedestrian, or transmitting a danger warning signal. When the type of the first object 101 is a signboard or a billboard, the menu UI 111 may include a plurality of items for receiving a user input to perform at least one of operations determined based on that the type of the first object 101 is a signboard or a billboard, and the operations may be obtaining food information, ordering from a food menu, or making a reservation.

The object information UIs 112 to 115 represent object information including at least one of profile information, wireless communication connection signal strength, battery level, or moving speed of the first object 101, in the form of characters, numbers, symbols, or icons. In an embodiment of the disclosure, the object information UIs 112 to 115 may include a profile image 112 and a profile phrase 113 of the first object 101, received from the first object 101. In an embodiment of the disclosure, the object information UIs 112 to 115 may further include a profile music UI 114 for playing profile music provided by the first object 101. In an embodiment of the disclosure, the object information UIs 112 to 115 may include a state information UI 115 including a first icon indicating the state of the wireless communication connection with the first object 101 and a second icon indicating the remaining battery capacity of the first object 101.

In the embodiment of the disclosure shown in FIG. 12, the electronic device 1000 may provide a technical effect to allow the user to intuitively select functions or operations related to the first object by displaying a contextual menu UI for the first object 101 on which the wireless communication connection is performed. The electronic device 1000 according to an embodiment of the disclosure may display a UI representing object information including at least one of profile information, wireless communication connection signal strength, battery level, or moving speed of the first object 101, in the form of characters, numbers, symbols, or icons, thereby enabling the user to intuitively recognize the state of the first object 101 and thus improving user convenience.

The electronic device 1000 according to an embodiment of the disclosure may display the focusing UI 140 including an icon or symbol encompassing the image corresponding to the first object 101 on the display 1600. The focusing UI 140 will be described in detail with reference to FIGS. 13A to 13C.

Figure 13A:
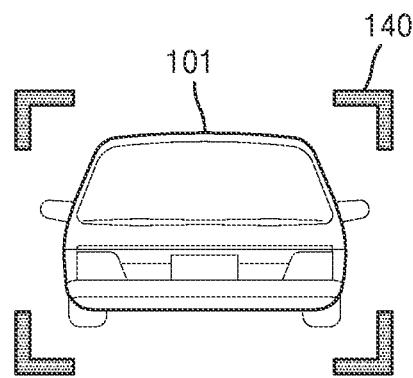
FIGS. 13A to 13C illustrate examples of a UI displayed by an electronic device according to an embodiment of the disclosure based on a traveling speed of an object.
Figure 13B:
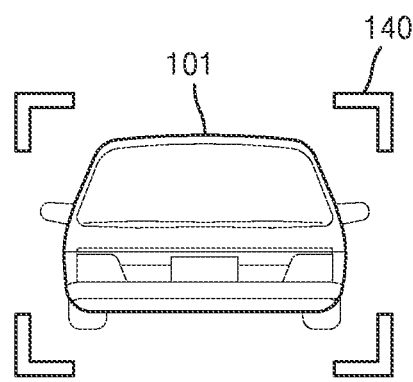
Figure 13C:
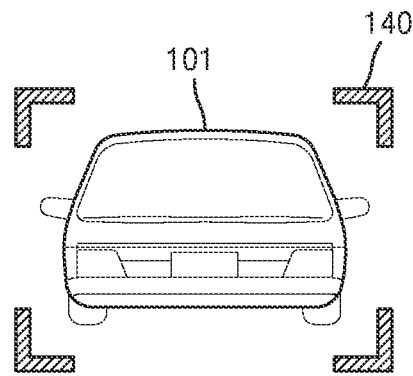

FIGS. 13A to 13C illustrate an example of a UI displayed by the electronic device 1000 according to an embodiment of the disclosure based on a traveling speed of an object.

The electronic device 1000 may display the focusing UI 140 encompassing the image corresponding to the first object 101 displayed on the display 1600 (see FIG. 12). The focusing UI 140 may include an icon or symbol encompassing four corner portions of the image of the first object 101. In an embodiment of the disclosure, the electronic device 1000 may monitor the moving speed of the first object 101, change the color of the focusing UI 140 according to the moving speed of the first object 101, and display the focusing UI 140.

Referring to FIG. 13A, when the first object 101 rapidly decelerates, the electronic device 1000 may display the focusing UI 140 in blue.

Referring to FIG. 13B, when the first object 101 cruises, the electronic device 1000 may display the focusing UI 140 in green.

Referring to FIG. 13C, when the first object 101 rapidly accelerates, the electronic device 1000 may display the focusing UI 140 in red.

In the embodiment of the disclosure shown in FIGS. 13A to 13C, the color of the focusing UI 140 is merely an example and is not limited to the above-described colors.

The electronic device 1000 according to the embodiment of the disclosure shown in FIGS. 13A to 13C may provide a technical effect of allowing the user to intuitively recognize the speed of the first object 101 by displaying the focusing UI 140 encompassing the image corresponding to the first object 101 on which the wireless communication connection is performed, in a different color according to the moving speed of the first object 101.

Figure 14:
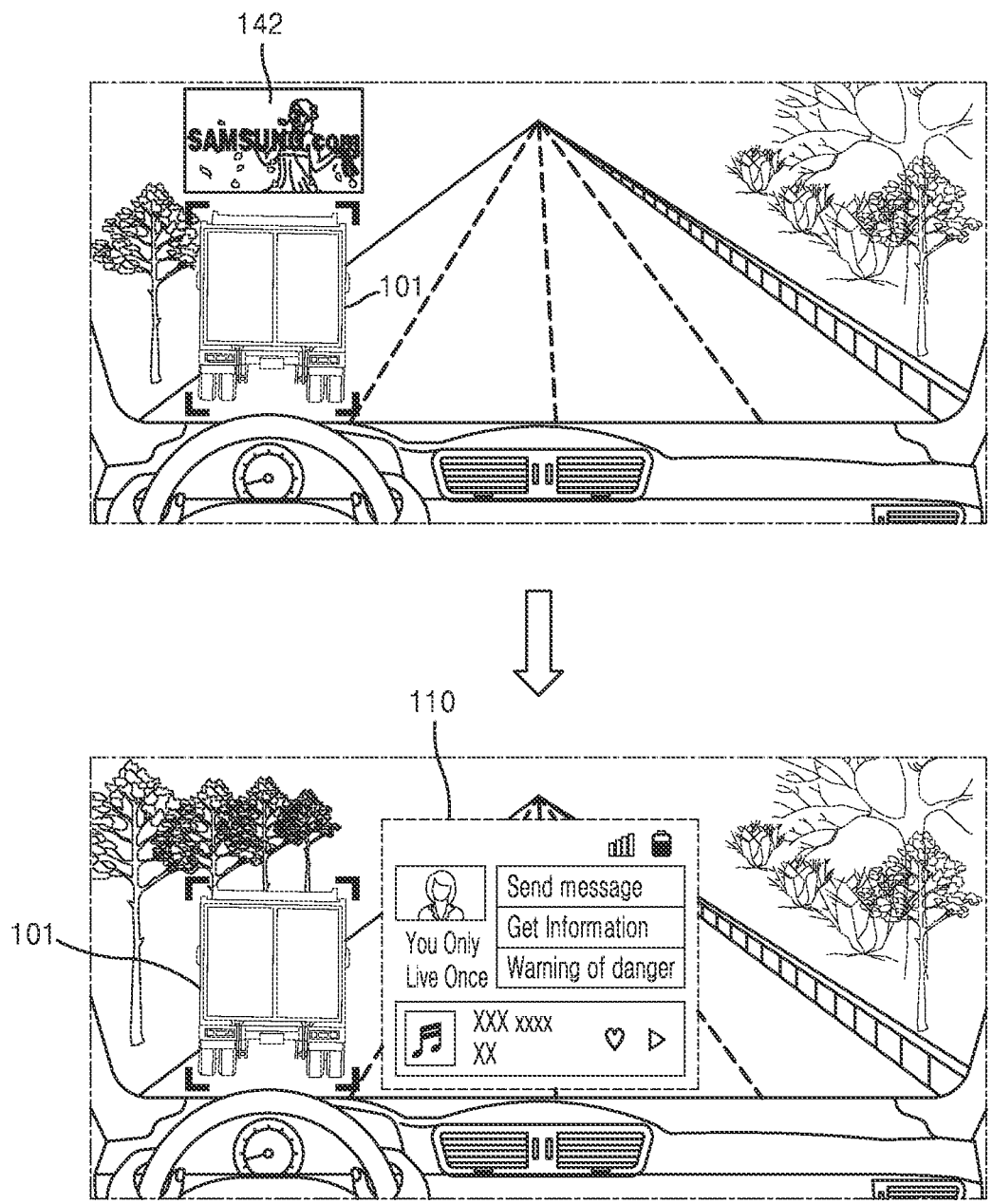
FIG. 14 is a view for describing an operation, performed by an electronic device according to an embodiment of the disclosure, of displaying a UI related to wireless communication connection after displaying content provided by an object.

FIG. 14 is a view for describing an operation, performed by the electronic device 1000 according to an embodiment of the disclosure, of displaying a UI related to a wireless communication connection after displaying content provided by an object.

Referring to FIG. 14, the electronic device 1000 may display a content image 142 including a commercial film (CF) or introduction image related to the first object 101 to which the wireless communication is connected. The content image 142 may include the CF or introduction image received from the first object 101. In an embodiment of the disclosure, the content image 142 may include name card or profile information indicating an advertisement target or introduction target of the first object 101. The content image 142 may be a video. However, the disclosure is not limited thereto, and the content image 142 may include a single image frame.

The electronic device 1000 may display the UI 110 for the first object 101 after the content image 142 is displayed. In an embodiment of the disclosure, the electronic device 1000 may display the content image 142 for a preset time interval and display the UI 110 after the elapse of the preset time. The UI 110 is the same as the UI 110 (see FIG. 12) shown in FIG. 12 and a redundant description thereof will be omitted.

Figure 15:
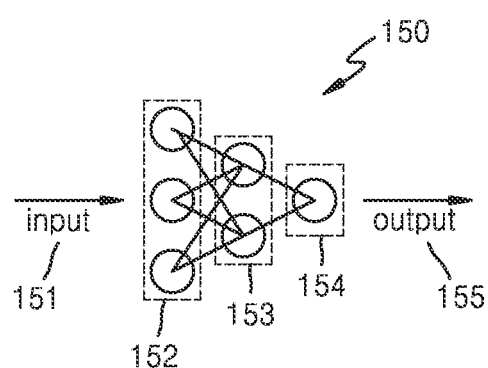
FIG. 15 is a view for describing an operation performed by an electronic device according to the disclosure by using an artificial intelligence (AI) technique.

FIG. 15 is a view for describing an operation performed by the electronic device 1000 according to an embodiment of the disclosure using an AI technique.

More specifically, the electronic device 1000 may perform, by using an AI technique employing a neural network, at least one of the operations of i) detecting at least one object from the surrounding environment image by using the AI model, and ii) of obtaining information about a type of the first object by using a detection result with respect to the surrounding environment image and the received V2X data set.

The AI technology may obtain a targeted result by performing processing such as analysis and/or classification, etc., with respect to input data based on operations through the neural network.

The AI technology may be implemented using an algorithm. Herein, the algorithm for implementing the AI technology or a set of algorithms may be referred to as the neural network. Herein, the neural network may receive input data and perform the above-described operations for analysis and/or classification, thus outputting result data. In order for the neural network to accurately output the result data corresponding to the input data, the neural network needs to be trained. Herein, 'training' may mean training the neural network to self-discover or learn a method of analyzing a plurality of pieces of input data with respect to the neural network, a method of classifying the plurality of pieces of input data, and/or a method of extracting features required for generation of result data from the plurality of pieces of input data. More specifically, through training, the neural network may optimize weight values in the neural network by training the input data (e.g., a plurality of different images). The neural network may output a targeted result by processing the input data through the neural network having the optimized weight values.

When there are a plurality of hidden layers which are internal layers that perform operations, that is, when the depth of the neural network that performs operations increases, the neural network may be classified as a deep neural network. Examples of the AI neural network may include, but not limited to, a CNN, an RNN, a restricted Boltzmann machine (RBM), a deep belief network (DBN), a bidirectional recurrent deep neural network (BRDNN), and a deep Q-network. The neural network may be segmented. For example, the CNN may be segmented into a deep convolution neural network (D-CNN), a Capsnet neural network (not shown), etc.

The 'AI model' may mean a neural network including at least one layer operating to receive input data and output a targeted result. The 'AI model' may mean hardware for executing an algorithm that performs operations through the neural network and outputs a targeted result, a set of a plurality of algorithms, a processor for executing an algorithm (or a set of algorithms), software for executing an algorithm (or a set of algorithms), or hardware for executing an algorithm (or a set of algorithms).

At least one of the operations of i) detecting at least one object from the surrounding environment image by using the AI model, and ii) of obtaining information about a type of the first object by using a detection result with respect to the surrounding environment image and the received V2X data set may be performed, based on the AI model.

Referring to FIG. 15, the neural network 150 may be trained by receiving an input of training data. The trained neural network 150 may receive input data 151 through an input terminal 152, and the input terminal 152, a hidden layer 153, and an output terminal 154 may perform operations for outputting output data 155 by analyzing the input data 151 and data delivered from a previous layer. While there is one hidden layer 153 in FIG. 15, this is merely an example, and there may be a plurality of hidden layers 153.

In a disclosed embodiment of the disclosure, the neural network 150 may be trained to display a menu UI selectable for performing functions or operations determined based on the type of the first object.

In a disclosed embodiment of the disclosure, the electronic device 1000 may be trained to display UIs in different colors and forms before, during, and after making the wireless communication connection with the selected first object.

In a disclosed embodiment of the disclosure, the neural network 150 may be trained to display at least one object included in the surrounding environment image in different colors according to types of the at least one object.

In a disclosed embodiment of the disclosure, the neural network 150 may be trained to display an object information UI that represents object information including at least one of profile information, wireless communication connection signal strength, battery level, or moving speed of the first object selected by the user input, as characters, numbers, symbols, or icons.

In a disclosed embodiment of the disclosure, the neural network 150 may be trained to display a focusing UI including an icon or symbol encompassing an image corresponding to the first object on the surrounding environment image and display the focusing UI in a different color according to the moving speed of the first object.

In a disclosed embodiment of the disclosure, the neural network 150 may be trained to display advertisement content or an introduction image received from the first object and display a UI related to the first object after the advertisement content or the introduction image is displayed.

In a disclosed embodiment of the disclosure, data or a program code related to the neural network 150 may perform at least one of the operations of i) detecting at least one object from the surrounding environment image by using the AI model, and ii) obtaining information about a type of the first object by using a detection result with respect to the surrounding environment image and the received V2X data set. The data or a program code related to the neural network 150 may be stored in the memory 1400 (see FIG. 2), and training using the neural network 150 may be performed by the processor 1300 (see FIG. 2). In this case, the processor 1300 may include an AI processor.

Alternatively, the neural network 150 that performs the above mentioned operations may be implemented in a separate device (not shown) or processor (not shown) distinguished from the electronic device 1000.

The foregoing operations using the neural network 150 may be performed by the server 2000 (see FIGS. 16 and 17) capable of communicating with the electronic device 1000 according to an embodiment of the disclosure through a wireless communication network. Communication between the electronic device 1000 and the server 2000 will be described with reference to FIGS. 16 and 17.

Figure 16:
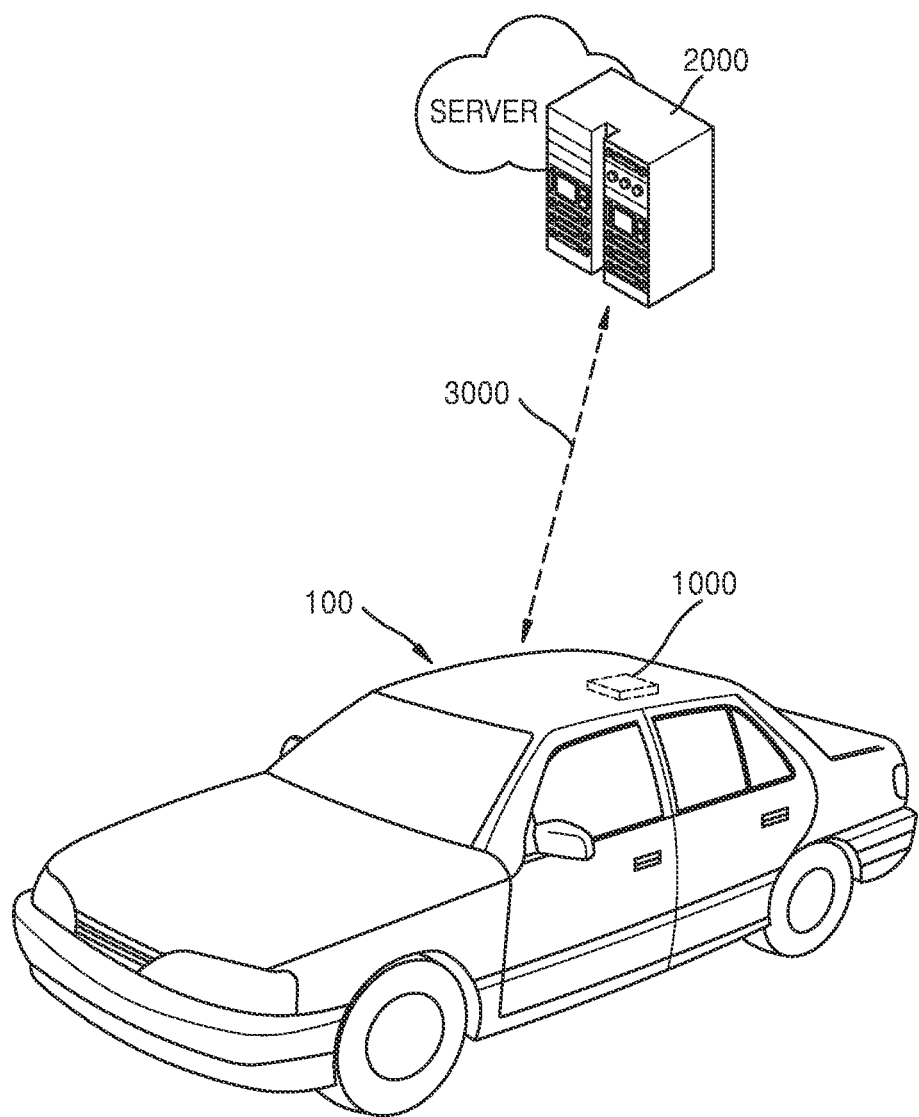
FIG. 16 is a view for describing a disclosed example where an electronic device according to the disclosure operates by interworking with a server.

FIG. 16 is a view showing the electronic device 1000 according to a disclosed embodiment of the disclosure, which operates with the server 2000.

The server 2000 may transmit and receive data to and from the electronic device 1000 through the communication network 3000 to process the data.

Referring to FIG. 17, the server 2000 may include a communication unit 2100 communicating with the electronic device 1000, a processor 2200 executing at least one instruction, and a database 2300.

The server 2000 may train an AI model and store the trained AI model. The server 2000 may perform, using the trained AI model, at least one of i) detecting at least one object from the surrounding environment image by using the AI model, and ii) of obtaining information about a type of the first object by using a detection result with respect to the surrounding environment image and the received V2X data set.

Generally, the electronic device 1000 may have limited memory storage capacity, operation processing speed, training data set collection ability, etc., when compared to the server 2000. Thus, operations requiring storage of large-volume data and large-scale computations may be performed in the server 2000, and then necessary data and/or AI model may be transmitted to the electronic device 1000 through the communication network. The electronic device 1000 may receive and use the necessary data and/or AI data through the server 2000 without a processor having a large-capacity memory and a fast-operating ability, thereby performing a required operation rapidly and easily.

In a disclosed embodiment of the disclosure, the server 2000 may include the neural network 150 described with reference to FIG. 15.

FIG. 17 is a view for describing in detail FIG. 16.

Referring to FIG. 17, the server 2000 may include the communication unit 2100, the processor 2200, and the database 2300.

The communication unit 2100 may perform communication with an external device (not shown) through a wireless communication network 3000. Herein, the external device may include a server that performs at least one of operations required by the electronic device 1000 or transmit or receive data, etc., required by the electronic device 1000.

The communication unit 2100 may include at least one communication module such as a short-range communication module, a wired communication module, a mobile communication module, a broadcasting receiving module, etc. Herein, the at least one communication module may mean a tuner for receiving broadcasting or a communication module capable of performing data transmission and reception through a network complying with a communication standard such as Bluetooth, a WLAN (WiFi), Wibro, Wimax, CDMA, WCDMA, Internet, 3G, 4G, 5G, and/or a communication scheme using millimeter waves (mmWave).

For example, the communication unit 2100 may rapidly transmit and receive large-volume data by performing communication using millimeter waves (mmWave). More specifically, the vehicle may quickly receive large-volume data by using mmWave and rapidly provide the V2X data set including the information related to the vehicle, the information related to the object (e.g., profile information, a wireless communication connection signal strength, a battery level, a moving speed, etc., of the object), etc.

The mobile communication module included in the communication unit 2100 may perform a communication with another device (e.g., the electronic device 1000) located at a remote distance through a communication network that complies with a communication standard such as 3G, 4G, and/or 5G. Herein, the communication module that performs the communication with the other device located at the remote distance may be referred to as a 'remote-distance communication module'. In an embodiment of the disclosure, the communication unit 2100 may transmit and receive data with the communication interface 1200 of the electronic device 1000 in a wired or wireless manner.

The processor 2200 may control the overall operation of the server 2000. For example, the processor 2200 may perform required operations by executing at least one of at least one instruction of the server 2000 or programs.

The database 2300 may include a memory (not shown) and store at least one of at least one instruction, programs, or data required for the server 2000 to perform a certain operation in the memory (not shown). The database 2300 may store data required for the server 2000 to perform an operation by a neural network.

In a disclosed embodiment of the disclosure, the server 2000 may store the neural network 150 described with reference to FIG. 15. The neural network 150 may be stored in at least one of the processor 2200 or the database 2300. The neural network 150 included in the server 2000 may be an already trained neural network having completed training.

The server 2000 may transmit the already trained neural network to the communication interface 1200 of the electronic device 1000. Then, the electronic device 1000 may obtain and store the already trained neural network and obtain target output data through the neural network.

A program executed by the electronic device 1000 described herein may be implemented as a hardware element, a software element, and/or a combination of the hardware element and the software element. A program may be executed by any system capable of executing computer-readable instructions.

Software may include a computer program, a code, an instruction, or a combination of one or more of them, and configure a processing device to operate as desired or independently or collectively instruct the processing device.

Disclosed embodiments of the disclosure may be implemented as a software (S/W) program including an instruction stored in a computer-readable storage media. The computer-readable recording media may include, for example, a magnetic storage medium (e.g., read-only memory (ROM), random access memory (RAM), a floppy disk, a hard disk, etc.) and an optical reading medium (e.g., compact disk (CD)-rom, a digital versatile disc (DVD), etc.). The computer-readable recording medium may be distributed over computer systems connected through a network to store and execute a computer-readable code in a distributed manner. The medium may be readable by a computer, and may be stored in a memory and executed in a processor.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

The control method according to the disclosed embodiments of the disclosure may be included and provided in a computer program product. The computer program product may be traded as a product between a seller and a buyer.

The computer program product may include a software (S/W) program and a non-transitory computer-readable recording medium in which the SAN program is stored. For example, the computer program product may include a product (e.g., a downloadable application) in the form of a software program electronically distributed through a manufacturer of the electronic device or the electronic market (e.g., Samsung Galaxy Store™, Google Playstore™, and App Store™). For the electronic distribution, at least a part of the software program may be stored in a storage medium or temporarily generated. In this case, the storage medium may be a storage medium of a server of a manufacturer of the vehicle or the electronic device 1000, a server of an electronic market, or a relay server that temporarily stores a software program.

In a system including the electronic device 1000, the server 2000 (see FIGS. 16 and 17), and the other electronic device, the computer program product may include the storage medium of the server 2000 or the storage medium of the electronic device. Alternatively, when there is a third device (e.g., a smart phone) communication-connected with the electronic device 1000, the computer program product may include a storage medium of the third device. Alternatively, the computer program product may include a software program itself, which is transmitted from the electronic device 1000 to the electronic device or the third device or transmitted from the third device to the electronic device.

In this case, one of the electronic device 1000, the electronic device, and the third device may execute the computer program product to perform the method according to the disclosed embodiments of the disclosure. Alternatively, two or more of the electronic device 1000, the electronic device, and the third device may execute the computer program product to perform the method according to the disclosed embodiments of the disclosure in a distributed manner.

For example, the electronic device 1000 may control another electronic device communication-connected to the electronic device 1000 to perform the method according to the disclosed embodiments of the disclosure, by executing a computer program product stored in the memory 1400 (see FIG. 2).

In another example, the third device may execute the computer program product to control an electronic device communication-connected to the third device to perform the method according the disclosed embodiment of the disclosure.

When the third device executes the computer program product, the third device may download the computer program product from the electronic device 1000 and execute the downloaded computer program product. Alternatively, the third device may execute a computer program product provided in a preloaded state to execute the method according to the disclosed embodiments of the disclosure.

While embodiments of the disclosure have been described by the limited embodiments of the disclosure and drawings, various modifications and changes may be made from the disclosure by those of ordinary skill in the art. For example, a suitable result may be achieved even when the described techniques may be performed in an order different from the described method, and/or elements of the described computer system, module, etc., may be coupled or combined in a form that is different from the described method, or replaced or substituted by other elements or equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device mounted on a vehicle, the electronic device comprising:
   a communication interface;
   a user input interface;
   a display;
   a camera mounted on the vehicle and configured to obtain a surrounding environment image by photographing a surrounding environment of the vehicle;
   a memory storing at least one instruction; and
   at least one processor configured to execute the at least one instruction stored in the memory,
   wherein the at least one processor is further configured to, by executing the at least one instruction:
      identify a plurality of objects from the surrounding environment image by using an object detection model;
      receive a message, the message including vehicle to everything (V2X) data set including information about the plurality of objects;
      match each one of the identified plurality of objects from the surrounding environment image with a respective plurality of portions of the information about the plurality of objects included in the V2X data set;
      select a first object in the identified plurality of objects based on a user input received through the user input interface;
      obtain information about a type of the first object by using an identification result determined based on the surrounding environment image and the received V2X data set; and
      display a user interface (UI) for wireless communication connection with the first object on the display, based on the information about the type of the first object,
   wherein the UI includes a menu UI selectable to perform a function or an operation determined based on the type of the first object and an object information UI representing information about at least one of profile information, wireless communication connection signal strength, or battery level of the first object.

2. The electronic device of claim 1, wherein the at least one processor is further configured to, by executing the at least one instruction, control the display to display images corresponding to the plurality of objects included in the surrounding environment image in different colors, according to types of the plurality of objects.

3. The electronic device of claim 1, wherein the at least one processor is further configured to, by executing the at least one instruction, control the display to display a focusing UI including an icon or a symbol encompassing an image corresponding to the first object on the surrounding environment image.

4. The electronic device of claim 3, wherein the at least one processor is further configured to, by executing the at least one instruction, control the display to display the focusing UI encompassing the first object in different colors according to moving speed of the first object.

5. The electronic device of claim 1, wherein the at least one processor is further configured to, by executing the at least one instruction:
   receive a content image including an advertisement image or an introduction image from the first object through the communication interface; and
   control the display to display the received content image, wherein the UI is displayed after the content image is displayed.

6. The electronic device of claim 1, wherein matching further comprises:
   obtain, from the surrounding environment image, license plate information, position information, type information, and/or predicted speed information of a first object;
   match the obtained information with a first portion of the respective plurality of portions of the information included in the received V2X data set; and
   extract identification information and type information of the first object from the received V2X data set, based on a result of the matching.

7. The electronic device of claim 1, wherein the at least one processor is further configured to identify corresponding information about the plurality of objects, and
   wherein the matching is based on the corresponding information.

8. The electronic device of claim 1, wherein the plurality of objects from the surrounding environment image are objects selected from a handheld portable electronic device and a stationary road side unit, and wherein the matching comprises matching at least one of the handheld portable electronic devices and the stationary road side unit with a respective plurality of portions of the information about the plurality of objects.

9. An operating method of an electronic device mounted on a vehicle, the operating method comprising:
   obtaining a surrounding environment image by photographing a surrounding environment of the vehicle by using a camera mounted on a front of the vehicle;
   identifying plurality of objects from the surrounding environment image by using an artificial intelligence (AI) model;
   receiving a message, the message including vehicle to everything (V2X) data set including information about the plurality of objects;
   matching each of the identified plurality of objects from the surrounding environment image with a respective plurality of portions of the information about the plurality of objects included in the V2X data set;
   selecting a first object in the identified plurality of objects, based on a user input;
   obtaining information about a type of the first object by using an identification result determined based on the surrounding environment image and the received V2X data set; and
   displaying a user interface (UI) for wireless communication connection with the first object on a display, based on the information about the type of the first object,
   wherein the UI includes a menu UI selectable to perform a function or an operation determined based on the type of the first object and an object information UI representing information about at least one of profile information, wireless communication connection signal strength, or battery level of the first object.

10. The operating method of claim 9, wherein the displaying of the UI further comprises displaying images corresponding to the plurality of objects included in the surrounding environment image in different colors, according to types of the plurality of objects.

11. The operating method of claim 9, wherein the displaying of the UI further comprises displaying a focusing UI including an icon or a symbol encompassing an image corresponding to the first object on the surrounding environment image.

12. The operating method of claim 11, wherein the displaying of the focusing UI further comprises displaying the focusing UI encompassing the first object in different colors according to moving speed of the first object.

13. The operating method of claim 9, further comprising displaying advertisement content or an introduction image received from the first object,
wherein the displaying of the UI is performed after the advertisement content or the introduction image is displayed.

14. The operating method of claim 9, wherein matching further comprises:
obtaining, from the surrounding environment image, license plate information, position information, type information, and/or predicted speed information of the first object;
matching the obtained information with information included in the received V2X data set; and
extracting identification information and type information of the first object from the V2X data set, based on a result of the matching.

15. A computer program product comprising a non-transitory computer-readable storage medium, wherein the non-transitory computer-readable storage medium comprises instructions, which are readable by an electronic device, to perform operations of:
obtaining a surrounding environment image by photographing a surrounding environment of a vehicle by using a camera;
identifying plurality of objects from the surrounding environment image by using an artificial intelligence (AI) model;
receiving a message, the message including vehicle to everything (V2X) data set including information about the plurality of objects;
matching each one of the identified plurality of objects from the surrounding environment image with a respective plurality of portions of the information about the plurality of objects included in the V2X data set;
selecting a first object in the identified plurality of objects, based on a user input;
obtaining information about a type of the first object by using an identification result determined based on the surrounding environment image and the received V2X data set; and
displaying a user interface (UI) for wireless communication connection with the first object, based on the information about the type of the first object and an object information UI representing information about at least one of profile information, wireless communication connection signal strength, or battery level of the first object.

\* \* \* \* \*